United States Patent
Kanai et al.

(10) Patent No.: US 8,044,968 B2
(45) Date of Patent: Oct. 25, 2011

(54) IMAGE PROCESSING DEVICE, COLOR CORRECTION TABLE GENERATION DEVICE, DISPLAY DEVICE, IMAGE PROCESSING METHOD, COLOR CORRECTION TABLE GENERATION METHOD, COLOR ADJUSTMENT METHOD FOR DISPLAY DEVICE, AND IMAGE PROCESSING PROGRAM

(75) Inventors: Masahi Kanai, Matsumoto (JP);
Hideaki Kasahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 831 days.

(21) Appl. No.: 12/099,335

(22) Filed: Apr. 8, 2008

(65) Prior Publication Data
US 2008/0259369 A1   Oct. 23, 2008

(30) Foreign Application Priority Data
Apr. 18, 2007   (JP) ................................. 2007-108980

(51) Int. Cl.
*G09G 5/00* (2006.01)
*G09G 5/02* (2006.01)
*H04N 1/46* (2006.01)
*G03F 3/08* (2006.01)
*G06K 9/00* (2006.01)
*G06K 9/32* (2006.01)
*G06K 9/40* (2006.01)
*H04N 4/225* (2006.01)

(52) U.S. Cl. ........ 345/601; 345/589; 345/600; 345/604; 345/606; 348/254; 348/441; 348/557; 348/671; 358/518; 358/519; 358/523; 358/525; 382/167; 382/254; 382/274; 382/300

(58) Field of Classification Search .......... 345/426–428, 345/581, 589–591, 600–602, 604, 606, 618–619; 348/254, 256, 441, 496, 557, 577, 602–603, 348/671–675; 358/515–520, 523–525; 382/162–167, 254, 274, 276, 300
See application file for complete search history.

(56) References Cited

U.S. PATENT DOCUMENTS

| 5,132,786 A * | 7/1992 | Ishiwata ........................ 358/500 |
| 6,765,586 B2 * | 7/2004 | Yamazaki et al. ............ 345/590 |

(Continued)

FOREIGN PATENT DOCUMENTS

JP   B2 2845523   10/1998

(Continued)

OTHER PUBLICATIONS

Ohta N., "A Simplified Method for Formulating Psuedo-Object Colors," Color Research and Application, 1982, vol. 7, pp. 78-81.

*Primary Examiner* — Wesner Sajous
(74) *Attorney, Agent, or Firm* — Oliff & Berridge, PLC

(57) ABSTRACT

The present invention provides an image processing device, a color correction table generation device, a display device, an image processing method, a color correction table generation method, a color adjustment method of a display device, and an image processing program capable of color matching to preferred colors of which excessive emphasis in chroma is suppressed. There are provided a chroma limit setting section for setting a chroma limit based on a optimal color, and a color correction table generation section for generating a color correction table by making a correspondence between an input color and an output color having chroma no greater than a chroma limit. The color correction table is stored in a color correction table storage section. The color correction execution section executes color correction along the color correction table so that the projector outputs a color with chroma no greater than the chroma limit.

14 Claims, 12 Drawing Sheets

U.S. PATENT DOCUMENTS

| | | |
|---|---|---|
| 7,167,275 B2 | 1/2007 | Fukasawa |
| 7,177,465 B1 * | 2/2007 | Takahira ................. 382/166 |
| 7,453,602 B2 * | 11/2008 | Shimada ................. 358/1.9 |
| 2003/0020725 A1 * | 1/2003 | Matsuda ................. 345/600 |
| 2005/0275911 A1 * | 12/2005 | Yamada et al. ........... 358/518 |
| 2008/0062443 A1 * | 3/2008 | Olson ................. 358/1.9 |
| 2008/0068510 A1 * | 3/2008 | Kanai ................. 348/672 |
| 2009/0289951 A1 * | 11/2009 | Matsuda ................. 345/589 |

FOREIGN PATENT DOCUMENTS

| | | |
|---|---|---|
| JP | A-2002-314832 | 10/2002 |
| JP | A 2006-254415 | 9/2006 |

* cited by examiner

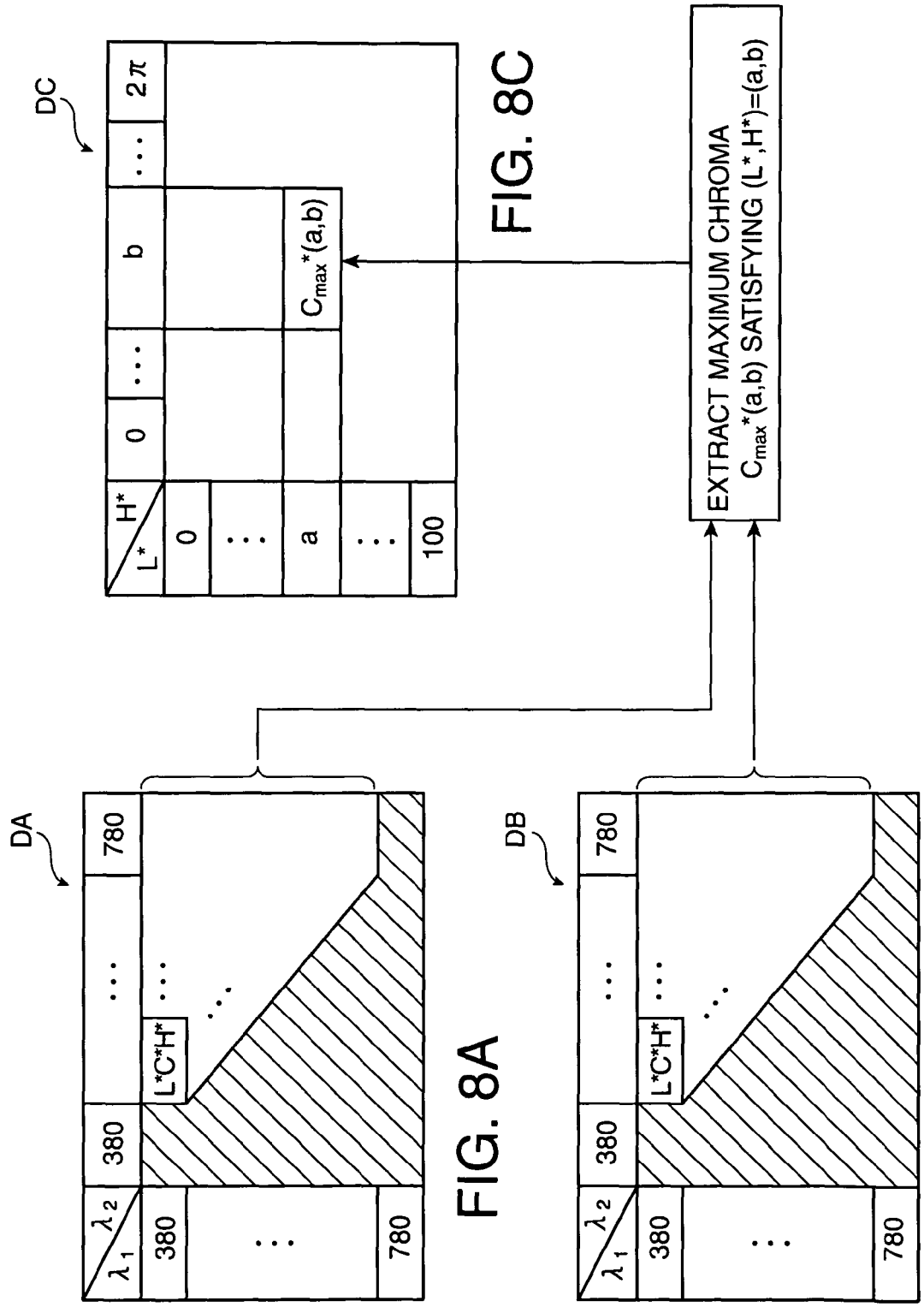

IMAGE PROCESSING DEVICE, COLOR CORRECTION TABLE GENERATION DEVICE, DISPLAY DEVICE, IMAGE PROCESSING METHOD, COLOR CORRECTION TABLE GENERATION METHOD, COLOR ADJUSTMENT METHOD FOR DISPLAY DEVICE, AND IMAGE PROCESSING PROGRAM

TECHNICAL FIELD

The present invention relates to an image processing device, a color correction table generation device, a display device, an image processing method, a color correction table generation method, a color adjustment method for a display device, and an image processing program.

BACKGROUND ART

In recent years, display devices such as liquid display devices or projectors having light emitting diodes (LEDs) as the light sources have been put into practical use. Further, display devices such as rear projectors having lasers as the light sources also have been under development. Since the LED light source or the laser source has a spectral characteristic with peaks respectively at R, G, and B wave lengths, by using the LED light source or the laser source as the light source of the display device, it becomes possible to improve color purity of monochromatic RGB to realize a wide color reproduction area in comparison with lamp light sources (cold-cathode tubes in the case with the liquid crystal displays, high-pressure mercury lamps, metal halide lamps, or the like in the case with the projectors) widely used in the past.

In the display devices having such wide color reproduction areas, in order for performing colorful display taking advantage of such wide color reproduction areas, it is required to perform color matching for expanding color gamut by converting the input color of input image data into a color on the wide color reproduction area.

As a method of expanding the color gamut in the related art, there is known a method of executing expanded mapping on the value of the color specification system by expanding the color gamut of the input side in accordance with a ratio of the color gamut between the input side and the output side (see e.g., Patent Document 1). By arranging that the color matching using the method described in the Patent Document 1 is executed on the display device with a wide color reproduction area, the colorful color output using the entire wide color reproduction area can be realized.

[Patent Document 1] Japanese Patent No. 2845523

DISCLOSURE OF THE INVENTION

Problems that the Invention is to Solve

However, in the color matching using the method described in the Patent Document 1, since it becomes that colors are output using the entire color reproduction area provided to the display device, in the case in which the color matching is executed on the display device with a wide color reproduction area, the chroma might be excessively emphasized in some cases. For example, in the case in which the chroma too high to normally exist in nature is included in the color reproduction area of the display device, if the color matching is executed so as to output color using the entire color reproduction area of the display device, it becomes that the chroma is excessively emphasized regarding a certain input color, and the color having the chroma too high to normally exist in nature is output. As described above, as a result of the color matching, in some cases, the input color might excessively be emphasized in chroma, thus providing the user viewing the output image of the display device with an unnatural impression.

Therefore, the present invention has an object of providing an image processing device, a color correction table generation device, a display device, an image processing method, a color correction table generation method, a color adjustment method of a display device, and an image processing program capable of color matching to preferred colors of which the excessive emphasis in chroma is suppressed.

Means for Solving the Problem

The image processing device for achieving the object described above is an image processing device for executing a color correction on an input color in a first color gamut into an output color in a second color gamut, includes a color correction table having a correspondence between an input color in a first color gamut and a color in a third color gamut within a range of a second color gamut and having chroma limited to be no greater than a chroma limit defining an upper limit of the chroma of the output color, and color correction means that executes color correction for converting the input color in the first color gamut with reference to the color correction table to determine the converted input color as the output color.

According to the present configuration, since the input color in the first color gamut is color-corrected into the color in the third color gamut within a range of the second color gamut and having the chroma limited to be equal to or smaller than the chroma limit, and determined to be the output color, the input color is corrected into the output color in the second color gamut and having the chroma limitation to have the chroma equal to or smaller than the chroma limit. Therefore, by the color matching from the first color gamut to the second color gamut, it becomes to obtain a preferred color with the chroma of which excessive emphasis is suppressed. It should be noted that the second color gamut preferably has a larger color gamut than the first color gamut. On this occasion, the preferred color can be obtained while suppressing the excessive chroma emphasis regardless of the size of the second color gamut.

The color correction table generation device, as another aspect of the invention, is a color correction table generation device for generating a color correction table for executing a color correction on an input color in a first color gamut into an output color in a second color gamut including chroma limit setting means that sets a chroma limit, and color correction table generation means that generates the color correction table by making the correspondence between the input color in the first color gamut and the color in the third color gamut within the range of the second color gamut and having chroma limited to be no greater than the chroma limit defining an upper limit of the chroma of the output color.

According to the present configuration, by making the correspondence between the input color in the first color gamut and the color in the third color gamut in which the chroma is limited to be equal to or smaller than the chroma limit, the color correction table can be generated. According to the present color correction table, since the chroma of the output color is limited to be equal to or smaller than the chroma limit, the color matching to the preferred color with the chroma of which the excessive emphasis is suppressed can be performed. It should be noted that the second color gamut preferably has a larger color gamut than the first color gamut. On this occasion, the preferred color can be obtained while suppressing the excessive chroma emphasis regardless of the size of the second color gamut.

Further, in the color correction table generation device according to the invention, the chroma limit setting means preferably sets the chroma limit based on the chroma of the optimal color.

According to the present configuration, since the input color in the first color gamut is provided with a correspondence with the output color having the chroma equal to or smaller than the chroma limit, which is set based on the chroma of the optimal color, according to the color correction table thus generated, the color matching to the natural color with the chroma of which the excessive emphasis is suppressed can be performed.

Further, in the color correction table generation device according to the invention, the chroma limit setting means preferably sets smaller one of the chroma of the optimal color and the maximum chroma in the second color gamut as the chroma limit under a condition of the same lightness and the same hue.

According to the present configuration, if the chroma of the optimal color is smaller than the maximum chroma included in the second color gamut under the condition of the same lightness and the same hue, the input color in the first color gamut is corrected to have the chroma equal to or smaller than the chroma of the optimal color, thereby being provided with a correspondence with the output color of a natural color. On the other hand, if the maximum chroma in the second color gamut is smaller than the chroma of the optimal color, the input color in the first color gamut is corrected to be a color with the chroma equal to or smaller than the maximum chroma in the second color gamut, thus being provided with a correspondence with the output color within the range of the second color gamut. According to the color correction table thus generated, the color matching to the natural color within the range of the second color gamut.

Further, in the color correction table generation device according to the invention, it is preferable that optimal color data generation means that sets a plurality of spectral reflectance characteristics as candidates of a spectral reflectance characteristic for obtaining a spectral characteristic of a supposed light source and the optimal color, calculates an object color for each of the plurality of spectral reflectance characteristics based on the present spectral reflectance characteristic and the spectral characteristic of the light source, selects a color having the maximum chroma out of the plurality of object colors having the same lightness and the same hue, and determines the selected color as the optimal color, thereby generating the optimal color data representing the optimal color is further provided, and the chroma limit setting means sets the chroma limit with reference to the optimal color data.

According to the present configuration, by calculating the object color for each of the plurality of spectral reflectance characteristics, and determining the object color having the maximum chroma out of the object colors having the same lightness and the same hue as the optimal color, the optimal color can be obtained by simple calculations.

Further, in the color correction table generation device according to the invention, it is preferable that each of the plurality of spectral reflectance characteristics has a spectral reflectance in a visible band having spectral characteristic having one of a convex shape and a concave shape defined by a first wavelength at which the reflectance changes from 0% to 100% and a second wavelength at which the reflectance changes from 100% to 0%, and the plurality of spectral reflectance characteristics are set by a plurality of combinations of the first wavelength and the second wavelength.

According to the present configuration, by obtaining the object color corresponding to the spectral reflectance having a spectral characteristic having a substantially convex shape or a substantially concave shape in the visible band, and determining the object color having the maximum chroma as the optimal color, the optimal color can be obtained with simple calculations.

Further, in the color correction table generation device according to the invention, the plurality of combinations of the first wavelength and the second wavelength preferably includes all of the combinations of wavelengths included in the visible band.

According to the present configuration, the object color is calculated for every combination of the first wavelength and the second wavelength included in the visible band, and by determining the color having the maximum chroma as the optimal color, the optimal color as the limit of the object color can accurately be obtained. According to the color correction table thus generated, the color matching to the natural color can more surely be performed.

Further, in the color correction table generation device according to the invention, it is preferable that optimal color data generation means that sets a spectral characteristic of a supposed light source, sets a plurality of spectral reflectance characteristics in a visible band having spectral characteristic having one of a substantially convex shape and a substantially concave shape defined by a first wavelength at which the reflectance changes continuously from 0% to 100% and a second wavelength at which the reflectance changes continuously from 100% to 0% in accordance with a plurality of combinations of the first wavelength and the second wavelength, calculates an object color for each of the plurality of spectral reflectance characteristics based on the present spectral reflectance characteristic and the spectral characteristic of the light source, selects a color having the maximum chroma out of the plurality of object colors having the same lightness and the same hue, and determines the selected color as a limited optimal color, thereby generating the optimal color data representing the limited optimal color is further provided, and the chroma limit setting means sets the chroma limit based on the limited optimal color with reference to the optimal color data.

According to the present configuration, the object color having the maximum chroma is determined as the limited optimal color using the spectral reflectance characteristic having a substantially convex shape or a substantially concave shape in which the reflectance changes continuously, and the chroma limit is set by the limited optimal color. Here, since the spectral characteristic of the color existing in nature is continuous, by using the limited optimal color, the limit of the object color existing more likely in nature can be determined as the chroma limit. Therefore, according to the color correction table thus generated, the color matching to the more natural color can be performed.

Further, in the color correction table generation device according to the invention, the plurality of combinations of the first wavelength and the second wavelength preferably includes all of the combinations of wavelengths included in the visible band.

According to the present configuration, the object color is calculated for every combination of the first wavelength and the second wavelength included in the visible band, and by determining the color having the maximum chroma as the limited optimal color, the color matching to a natural color can more surely be performed.

Further, in the color correction table generation device according to the invention, the color correction table generation means preferably makes a correspondence between the input color on the outermost shell of the first color gamut and a color having the same lightness and the same hue as those of the input color and the chroma of the chroma limit.

According to the present configuration, the color correction table having the input color on the outermost shell of the first color gamut provided with a correspondence with the output color having the chroma of the chroma limit is generated. Therefore, according to the color correction table thus generated, the color matching of the first color gamut using the large color gamut within the second color gamut can be performed while suppressing the excessive chroma emphasis.

Further, in the color correction table generation device according to the invention, the color correction table generation means preferably makes a correspondence between the input color inside the outermost shell of the first color gamut and a color having the same lightness and the same hue as those of the input color and the chroma moving closer to the chroma limit from the chroma of the input color.

According to the present configuration, the color correction table having the input color inside the outermost shell of the first color gamut provided with a correspondence with the color having the chroma moved closer to the chroma limit is generated. Therefore, according to the color correction table thus generated, the color matching of the color inside the outermost shell of the first color gamut to a color having a natural chroma characteristic can be preformed while suppressing the excessive chroma emphasis.

Further, in the color correction table generation device according to the invention, it is preferable that a color output characteristic measurement section that measures color output characteristic of a display device as an application object of the color correction table is further provided, and a reproduction area the display device can reproduce is determined as the second color gamut based on the result of the measurement of the color output characteristic of the display device.

According to the present configuration, the color correction table having the input color provided with a correspondence with the color within the range of the color reproduction area of the display device as the application object can be obtained. According to the color correction table, the color matching suitable to the color reproduction area of the display device can be performed while suppressing the excessive chroma emphasis.

Further, a display device according to the invention includes an input section to which image data is input, the image processing device described above that corrects an input color of the input image data, and a display section that displays an image of the input image data based on an output color corrected by the image processing device, and the first color gamut is the color gamut of the input image data.

According to the present configuration, since the color of the image data input thereto is corrected into a color having the chroma equal to or smaller than the chroma limit, it becomes possible to display a preferred color with the chroma of which the excessive emphasis is suppressed.

Further, in the display device according to the invention, it is preferable to further include the color correction table generation device described above.

According to the present configuration, by generating the color correction table and performing the color correction with reference to the color correction table, the image with preferred colors with the chroma of which the excessive emphasis is suppressed can be performed.

An image processing method according to the invention is an image processing method for executing a color correction on an input color in a first color gamut into an output color in a second color gamut, includes converting the input color in the first color gamut with reference to a color correction table having a correspondence between an input color in a first color gamut and a color in a third color gamut within a range of a second color gamut and having chroma limited to be no greater than a chroma limit defining an upper limit of the chroma of the output color, and determining the input color thus converted as the output color.

According to the present configuration, the color matching to a preferred color with the chroma of which the excessive emphasis is suppressed can be performed.

A color correction table generation method of the invention is a color correction table generation method for generating a color correction table for executing a color correction on an input color in a first color gamut into an output color in a second color gamut including the step of setting a chroma limit, and the step of generating the color correction table by making the correspondence between the input color in the first color gamut and the color in the third color gamut within the range of the second color gamut and having chroma limited to be no greater than the chroma limit defining an upper limit of the chroma of the output color.

According to the present configuration, the color correction table for performing the color matching to a preferred color with the chroma of which the excessive emphasis is suppressed can be generated.

A color adjustment method of a display device according to the invention is a color adjustment method of a display device for executing color correction on a input color in a first color gamut into an output color with reference to a color correction table, including the step of obtaining a second color gamut the display device can reproduce, the step of setting a chroma limit, the step of generating a color correction table by providing a correspondence between an input color in a first color gamut and a color in a third color gamut within a range of a second color gamut and having chroma limited to be no greater than a chroma limit defining an upper limit of the chroma of the output color, and the step of applying the color correction table thus generated to the display device.

According to the present configuration, the color output characteristic of the display device can be adjusted so as to output a preferred color with the chroma of which the excessive emphasis is suppressed.

An image processing program according to the present invention is an image processing program for executing a color correction on an input color in a first color gamut into an output color in a second color gamut, and making a computer execute the step of retrieving a color correction table having a correspondence between an input color in a first color gamut and a color in a third color gamut within a range of a second color gamut and having chroma limited to be no greater than a chroma limit defining an upper limit of the chroma of the output color from a storage section for storing the color correction table, and the step of executing color correction for converting the input color in the first color gamut with reference to the retrieved color correction table to determine the converted input color as the output color.

According to the present configuration, the image processing program for performing the color matching to a preferred color with the chroma of which the excessive emphasis is suppressed can be obtained.

BEST MODE FOR CARRYING OUT THE INVENTION

First Embodiment

A first embodiment of out of embodiments according to the invention will hereinafter be explained with reference to the accompanying drawings.

FIG. 1 is a block diagram showing a configuration of a projector according to the first embodiment. The projector 1 of the present embodiment is a so-called front projector, which modulates a light beam from an LED light source (not shown) with a liquid crystal panel 40 as a light valve, and enlargedly projecting the light beam on a screen or a wall with a projection lens, also not shown, thereby displaying an image. The projector 1 is capable of setting a mode by selecting it from two or more color modes such as a color priority mode, a brightness priority mode, a color gamut priority color mode, and various kinds of characteristics regarding the color gamut (e.g., the color gamut of sRGB or the color reproduction area of the projector 1) as an output target, color temperature of the white point, the gamma characteristic, brightness, and so on are determined for every color mode.

As shown in FIG. 1, the projector 1 is provided with an image data input section 10 for receiving input of image data, an image processing section 20 for executing color correction on the image data, and an L/V drive section 30 for control driving of the liquid crystal panel 40 in accordance with the data on which the color correction has been executed.

The image data input section 10 performs an input operation for receiving the input of the image data from an external apparatus such as a personal computer or a DVD reproduction device, and transferring it to the image processing section 20 after converting it into input values of a predetermined data format. The image processing section 20 executes the image processing on the input values $R_{in}$, $G_{in}$, and $B_{in}$, and outputs the output values $R_{out}$, $G_{out}$, and $B_{out}$ after the image processing to the L/V drive section 30. The L/V drive section 30 drives the liquid crystal panel 40 based on the output values $R_{out}$, $G_{out}$, and $B_{out}$, thereby making it display the projection image corresponding to the output values $R_{out}$, $G_{out}$, and $B_{out}$.

The configuration of the image processing section 20 will hereinafter be described. According to a rough classification, the image processing section 20 has a color correction table generation section 200 for generating a color correction table for three-dimensional color correction and a color correction table for one-dimensional color correction, and a color correction section 210 for executing the three-dimensional color correction and the one-dimensional color correction on the input values $R_{in}$, $G_{in}$, and $B_{in}$ with reference to the color correction table thus generated. It should be noted that as shown in FIG. 2, the projector 1 is provided with a CPU 21 as a main control device, a RAM 22 used as a working memory, and a flash memory (a storage section) 23 for previously storing an image processing program. Each of the configuration elements of the image processing section 20 functions by the CPU 21 retrieving and then executing the image processing program stored in the flash memory 23.

The color correction table generation section 200 is provided with a color output characteristic data storage section 201 storing the color output characteristic data of the projector 1, a optimal color data generation section 202 for generating the optimal color data, a chroma limit setting section 203 for setting a chroma limit of the output color from the optimal color data, a first color correction table generation section 204 for generating a first color correction table (a color correction table) from the chroma limit and the color output characteristic data, and a second color correction table generation section 205 for generating a second color correction table from the color output characteristic data. It should be noted that the first color correction table is a three-dimensional table for performing color matching corresponding to the color mode, and the first color correction table generation section 204 generates the first color correction table for each of the plurality of color modes. The second color correction table is a one-dimensional table for adjusting the a gray-scale characteristic of each of the colors, R, G, and B in accordance with the color mode, and the second color correction table generation section 205 generates the second color correction table for each of the plurality of color modes.

The color correction section 210 is provided with a first color correction table storage section 211 for storing the two or more first color correction tables thus generated, a second color correction table storage section 212 for storing the two or more second color correction tables thus generated, a color correction table selection section 213 for selecting the first color correction table and the second color correction table in accordance with the set color mode, a first color correction execution section 214 for executing the three-dimensional color correction on the input values $R_{in}$, $G_{in}$, and $B_{in}$ with reference to the first color correction table thus selected, and a second color correction execution section 215 for executing the one-dimensional color correction on the values on which the three-dimensional color correction has been executed with reference to the second color correction table thus selected.

Here, the color correction by the first color correction execution section 214 and the second color correction execution section 215 is executed along the first and second color correction tables generated by the first color correction table generation section 204 and the second color correction table generation section 205, and the correction content of the color correction is determined substantially by the color correction tables. In order for explaining the three-dimensional color correction by the first color correction table and the one-dimensional color correction by the second color correction table, the process executed by each of the configuration elements of the color correction table generation section 200 will hereinafter be described.

The color output characteristic data storage section 201 stores the color output characteristic data. The color output characteristic data is data showing the color output characteristic of the projector 1. Specifically, the color output characteristic data represents a relationship between the liquid crystal panel input value and the lightness of the output light in each of the colors, R, G, and B, the chromaticity coordinates of the colors the projector 1 outputs in response to the input values of red, green, blue, and white, and the range of the color reproduction area the projector 1 is capable of reproducing. In the present embodiment, it is assumed that the color output characteristic of the projector 1 is measured before shipping, and the color output characteristic data as the result of the measurement has previously been stored in the color output characteristic data storage section 201 (practically, a flash memory 23).

The optimal color data generation section 202 generates the optimal color data representing the optimal color. Here, the optimal color denotes the color forming theoretical limit of the object color. As a calculation method of the optimal color, in the present embodiment, there is used a method of assuming a number of spectral reflectance characteristics (see FIG. 7) with convex or concave shapes as candidates of the spectral reflectance characteristic for obtaining the optimal color, and determining the color to be the optimal color among the object colors calculated with respect to the respective spectral reflectance characteristics. This is because, it is conceivable that since the steeper the reflectance changes from 0% to 100% or from 100% to 0%, the more the color purity is improved to increase the chroma in a certain wavelength, the optimal color, which is the theoretical limit of the object color, can be obtained with respect to the convex or concave spectral reflectance characteristics shown in FIGS. 7(a), (b). Although a detailed explanation regarding the calculation method of the optimal color will be described later, the calculation method of the optimal color is not limited thereto, a method known to the public such as a method described in the document known to the public (Ota, "A simplified method for formulating pseudo-object colors," "Color Research and Application," 1982, vol. 7, pp. 78-81) can also be used.

The chroma limit setting section 203 sets the chroma limit representing an upper limit value of the chroma of the color to be output from the chroma of the optimal color with reference to the optimal color data. The chroma limit setting section 203 treats the color within the optimal color as a natural color normally existing in nature assuming that the color having a chroma exceeding that of the optimal color does not normally exist in nature. Therefore, by setting the optimal color as the chroma limit and limiting the output color of the projector 1 to colors with the chroma no greater than that of the optimal color, it is possible to output natural colors while preventing output of unnatural colors. It should be noted that since the projector 1 does not reproduce the colors outside the range of the color reproduction area, the chroma limit setting section 203 sets the neatest chroma to the chroma of the optimal color within the range of the color reproduction area of the projector 1 as the chroma limit with reference to the optimal color of the optimal color data and the color reproduction area of the color output characteristic data.

The first color correction table generation section 204 generates the first color correction table for executing the three-dimensional color matching. The first color correction table is a table arranged to give the input colors correspondences with the output colors having chroma no greater than the chroma limit thus set. As shown in FIG. 3 as an example, the first color correction table generation section 204 makes a correspondence of the chroma of colors so that the chroma range "0 through $C_h^*$" of the input colors corresponds to the chroma range "0 through the chroma limit $C_{lim}^*$" of the output colors, thereby performing the chroma extension (see FIG. 3(a)) or the chroma compression (see FIG. 3(b)). Therefore, by executing the color correction along the first color correction table generated by the first color correction table generation section 204, it becomes that the input colors are corrected into the output colors having the chroma no greater than the chroma limit $C_{lim}^*$. In other words, the color correction with the chroma limited to be no greater than the chroma limit $C_{lim}^*$ is executed. It should be noted that in order for reducing the memory capacity necessary for storing the first color correction table, in the first correction table, the correspondences between the input colors and the output colors are made for a plurality of input colors on the lattice points in the color gamut of the input colors.

The second color correction table generation section 205 generates the second color correction table for adjusting the gray-scale characteristic of each of the colors, R, G, and B and the color temperature of the white point based on the color output characteristic data. FIG. 4 is a diagram for explaining the color correction with the second color correction table, wherein a part (a) shows an example of a device characteristic of the liquid crystal panel, a part (b) shows an example of a gray-scale characteristic to be an output target, and a part (c) shows an example of the color correction with the second color correction table. As shown in the part (a) of FIG. 4, the liquid crystal panel 40 has a device characteristic in which the input value of the liquid crystal panel (i.e., the output value to the liquid crystal panel 40) and the lightness of the actual output light have a nonlinear relationship. Therefore, in order for provide the γ-curve gray-scale characteristic shown in the part (b) of FIG. 4, namely the gamma characteristic as the target output characteristic of the liquid crystal panel 40, it is required to execute the gray-scale conversion shown in the part (c) of FIG. 4 on the input value of the liquid crystal panel. Therefore, the second color correction table generation section 205 sets the target characteristic having a gamma characteristic as shown in the part (b) of FIG. 4 to each of the colors, R, G, and B in accordance with the setting (specifically, the gamma characteristic and the color temperature of the white point) of the color mode while adjusting the color temperature of the white point in consideration of the color balance among R, G, and B. Then, the second color correction table is generated by giving correspondences between the input values of the liquid crystal panel before and after the correction so as to be the target characteristic as shown in the part (c) of FIG. 4.

As explained above, the first color correction table and the second color correction table are generated by the color correction table generation section 200. The color correction section 210 executes the color correction along the first color correction table, thereby performing color matching with the chroma limited to be no greater than the chroma limit. Then, by executing the color correction along the second color correction table, the output value (i.e., the input value of the liquid crystal panel) is corrected in accordance with the device characteristic of the liquid crystal panel 40, and the color on which the color matching is executed is output.

Flow of the process performed by the image processing section 20 will hereinafter be explained along the flowchart shown in FIG. 5. It should be noted that the process of generating the first color correction table, which is a principal feature of the invention, will hereinafter be explained in detail assuming that the second color correction table has been previously generated by the second color correction table generation section 205 prior to the process shown in FIG. 5, and the second color correction table storage section 212 has already stored a plurality of second color correction tables respectively corresponding to the color modes.

The process shown in FIG. 5 starts when the CPU 21 executes the program stored in the flash memory 23. When the process shown in FIG. 5 starts, the first color correction table generation section 204 selects either one of the two or more color modes (step S100). Then, the second color correction table corresponding to the selected color mode is retrieved from the second color correction table storage section 212 (step S200), and the color output characteristic data is retrieved from the color output characteristic data storage section 201 (step S300). Further, for the sake of convenience of explanation, in the explanations of the steps S400 through S600 described below, it is assumed that the color gamut priority mode in which the size of the color gamut is provided with priority is selected in the step S100, and the color reproduction area of the projector 1 is the target color gamut.

Subsequently, the optimal color data generation section 202 executes the optimal color data generation process (step S400). FIG. 6 is a flowchart showing flow of the optimal color data generation process. When the optimal color data generation process starts, the optimal color data generation section 202 determines the type of the light source (step S410). Here, the light source is selected from a plurality of candidates for the light source such as the standard illuminant D65 as the standard light or the standard illuminant A in accordance with the color temperature of the white point set in the color mode thus selected, namely the color temperature of the white point adjusted along the second color correction table retrieved in the step S200. For example, if the color temperature of the white point is 6500K, the standard illuminant D65 is selected.

Subsequently, the optimal color data generation section 202 sets the spectral reflectance characteristic (step S420). Here, as shown in FIG. 7(a), there are set two spectral reflectance characteristics, namely the convex-shaped spectral reflectance characteristic (hereinafter referred to as "the spectral reflectance pattern A") having the reflectance R of "100%" in the wavelength band of no smaller than the wavelength $\lambda_1$ and no greater than the wavelength $\lambda_2$ and of "0%" in the other wavelength bands, and the concave-shaped spectral reflectance characteristic (hereinafter referred to as "the spectral reflectance pattern B") having the reflectance R of "0%" in the wavelength band of no smaller than the wavelength $\lambda_1$ and no greater than the wavelength $\lambda_2$ and of "100%" in the other wavelength bands. Specifically, by determining a set of wavelengths $\lambda_1$ and $\lambda_2$ satisfying the condition "$380 \leq \lambda_1$, $\lambda_2 \leq 780$ (where $\lambda_2 - \lambda_1 > \lambda_{min}$, and $\lambda_{min}$ is a predetermined value providing the minimum width between $\lambda_1$ and $\lambda_2$)," the two spectral reflectance characteristics, the spectral reflectance pattern A and the spectral reflectance pattern B, are set. It should be noted that the wavelength $\lambda_1$ in the spectral reflectance pattern A corresponds to a first wavelength described in the appended claims, and the wavelength $\lambda_2$ therein corresponds to a second wavelength described in the appended claims. Further the wavelength $\lambda_1$ in the spectral reflectance pattern B corresponds to the second wavelength described in the appended claims, and the wavelength $\lambda_2$ therein corresponds to the first wavelength described in the appended claims.

Subsequently, the optimal color data generation section 202 calculates the object color corresponding to the spectral reflectance pattern A under the illumination of the set light source (step S430). The object color is calculated along the following formulas (1) through (12). Here, "$R(\lambda)$" is the spectral reflectance characteristic thus set, "$P(\lambda)$" is the spectral characteristic of the light source, "x, y, z (with overbars)" are color-matching functions, "$X_W/Y_W/Z_W$" are X/Y/Z values of the reference white, and "k" is a coefficient determined so that the lightness Y becomes a predetermined value in the perfectly diffuse reflector. The optimal color data generation section 202 calculates the X/Y/z values from the $R(\lambda)$ and $P(\lambda)$ along the formulas (1) through (3), and converts the X/Y/Z values into L*/C*/H* values along the formulas (4) through (12). The object color (L*/C*/H* values) corresponding to the spectral reflectance pattern A is stored in the RAM 22, thereby registering it in object color data DA representing a relationship between the wavelengths $\lambda_1$, $\lambda_2$ and the L*/C*/H* values as shown in a part (a) of FIG. 8.

[Formula 1]

$$X = k \int_{380}^{780} R(\lambda)P(\lambda)\bar{x}(\lambda)\,d\lambda \quad (1)$$

$$Y = k \int_{380}^{780} R(\lambda)P(\lambda)\bar{y}(\lambda)\,d\lambda \quad (2)$$

-continued $$Z = k \int_{380}^{780} R(\lambda)P(\lambda)\bar{z}(\lambda)\,d\lambda \quad (3)$$

$$u'_W = 4X_W/(X_W + 15Y_W + 3Z_W) \quad (4)$$

$$v'_W = 9Y_W/(X_W + 15Y_W + 3Z_W) \quad (5)$$

$$u' = \begin{cases} u'_W & (X = Y = Z = 0) \\ 4X/(X + 15Y + 3Z) & \text{(other than the } above) \end{cases} \quad (6)$$

$$v' = \begin{cases} v'_W & (X = Y = Z = 0) \\ 9Y/(X + 15Y + 3Z) & \text{(other than the } above) \end{cases} \quad (7)$$

$$L^* = \begin{cases} 903.3(Y/Y_W) & (Y/Y_W \leq 0.008856) \\ 116(Y/Y_W)^{1/3} - 16 & (Y/Y_W > 0.008856) \end{cases} \quad (8)$$

$$u^* = 13L*(u' - u'_W) \quad (9)$$

$$v^* = 13L*(v' - v'_W) \quad (10)$$

$$C^* = (u^{*2} + v^{*2})^{1/2} \quad (11)$$

$$H^* = \begin{cases} \tan^{-1}(v^*/u^*) & (u^* \geq 0) \\ \tan^{-1}(v^*/u^*) + \pi & (u^* < 0, v^* \geq 0) \\ \tan^{-1}(v^*/u^*) - \pi & (u^* < 0, v^* < 0) \end{cases} \quad (12)$$

Subsequently, the optimal color data generation section 202 calculates the object color corresponding to the spectral reflectance pattern B under the illumination of the set light source (step S440). Here, in a similar manner to the step S430, the object color (L*/C*/H* values) corresponding to the spectral reflectance pattern B is calculated, and the L*/C*/H* values are registered in object color data DB representing a relationship between the wavelengths $\lambda_1$, $\lambda_2$ and the L*/C*/H* values as shown in a part (b) of FIG. 8.

Subsequently, the optimal color data generation section 202 judges whether or not the process of steps S420 through S440 has been completed with respect to all of the combinations of the wavelengths $\lambda_1$, $\lambda_2$ (step S450). If the process has not been completed with respect to the all of the combinations of the wavelengths $\lambda_1$, $\lambda_2$ satisfying the condition "$380 \leq \lambda_1$, $\lambda_2 \leq 780$ (where $\lambda_2 - \lambda_1 > \lambda_{min}$)" (No, in the step S450), the process returns to the process of the step S420 to newly set the combination of the wavelengths $\lambda_1$, $\lambda_2$ not yet processed. If the process has already been completed with respect to the all combinations (Yes, in the step S450), the process proceeds to the step S460 in the condition in which the object color corresponding to the spectral reflectance pattern A is registered in the object color data DA and the object color corresponding to the spectral reflectance pattern B is registered in the object color data DB with respect to the all of the combinations of the wavelengths $\lambda_1$, $\lambda_2$.

When the process proceeds to the step S460, the optimal color data generation section 202 stores the color with the maximum chroma of those registered in the object color data DA, DB in the memory area of the RAM 22 as the optimal color with respect to each of the combinations of the lightness L* and the hue H*, thereby registering the optimal color in optimal color data DC. Taking FIG. 8 as an example, the optimal color data generation section 202 searches for the maximum chroma $C_{max}^*$ (a, b) having the maximum chroma value out of the object colors having the combination of the lightness L* (=a) and the hue H* (=b) with reference to the L*, C*, and H* values registered in the object color data DA, DB. Further, the optimal color data generation section 202 registers the color having the lightness, chroma, and hue of (a, $C_{max}$* (a, b), b) in the optimal color data DC as the optimal color as shown in a part (c) of the FIG. 8. By executing such a process on all of the combinations of the lightness L* (=0 through 100) and the hue H* (=0 through 2π), the optimal color data DC representing the optimal color with respect to all of the combinations of the lightness L* and the hue H* is generated. After the process has been executed with respect to all of the combinations of the lightness L* and the hue H*, the optimal color data generation process is terminated.

After the optimal color data generation process has been terminated, the process returns to the process shown in FIG. 5, and the color correction table generation section 200 executes a first color correction table generation process (step S500). FIG. 9 is a flowchart showing flow of the first color correction table generation process. Hereinafter, the first color correction table generation process will be explained along the flowchart shown in FIG. 9.

When starting the first color correction table generation process, the chroma limit setting section 203 executes color conversion on the input color $R_t$, $G_t$, and $B_t$ on the lattice point to calculate the lightness $L_t$*, the chroma $C_t$*, and the hue $H_t$* of the input color (step S510). The color conversion in this case is executed by converting the input color $R_t/G_t/B_t$ into the X/Y/z values along the formulas (13) through (18), and then converting the X/Y/Z values into the input color $L_t$*/$C_t$*/$H_t$* along the formulas (4) through (12). It should be noted that "γ" is the γ-value of the gamma characteristic, and "$R_{max}$, $G_{max}$, and $B_{max}$" are the maximum values (e.g., "255" in the case in which the image processing section 20 handles 8 bits for each of the R, G, and B values) the R, G, and B values can take, respectively. The matrix Mt used in the formula (16) can be obtained along the formulas (17) and (18) using the color coordinates "$x_R/y_R/z_R$, $x_G/y_G/z_G$, $x_B/y_B/z_B$, $x_W/y_W/z_W$," of red, green, blue, and white, respectively, determined as the color space of the input color.

[Formula 2]

$$r = (R/R_{max})^\gamma \quad (13)$$

$$g = (G/G_{max})^\gamma \quad (14)$$

$$b = (B/B_{max})^\gamma \quad (15)$$

$$\begin{pmatrix} X \\ Y \\ Z \end{pmatrix} = M_t \begin{pmatrix} r \\ g \\ b \end{pmatrix} \quad (16)$$

$$M = \begin{pmatrix} T_R & 0 & 0 \\ 0 & T_G & 0 \\ 0 & 0 & T_B \end{pmatrix} \begin{pmatrix} x_R & x_G & x_B \\ y_R & y_G & y_B \\ z_R & z_G & z_B \end{pmatrix} \quad (17)$$

$$\begin{pmatrix} X \\ Y \\ Z \end{pmatrix} = \begin{pmatrix} x_R & x_G & x_B \\ y_R & y_G & y_B \\ z_R & z_G & z_B \end{pmatrix}^{-1} \begin{pmatrix} x_W/y_W \\ y_W/y_W \\ z_W/y_W \end{pmatrix} \quad (18)$$

Subsequently, the chroma limit setting section 203 calculates the maximum chroma of the projector 1 at the lightness $L_t$* and the hue $H_t$* of the input color (step S520). The chroma limit setting section 203 obtains the color reproduction area of the projector 1 with reference to the color output characteristic data stored in the color output characteristic data storage section 201, and obtains the maximum chroma satisfying the lightness and the hue equivalent to the lightness $L_t$*, the hue $H_t$* of the input color within the color reproduction area of the projector 1, namely the maximum chroma of the projector 1. FIG. 10 shows an example of illustrating the color reproduction area of the projector 1 and the optimal color on the L*C*-plane. In the drawing, "$GA_t$" is the color gamut (e.g., the color gamut of the sRGB color space) of the input color, "$GA_d$" is the color reproduction area of the projector 1, and "$L_m$" is a line connecting the color points of the optimal color. In the example shown in FIG. 10, with respect to the color point P1, the chroma of the color point P3, which has the same lightness and hue as the color point P1 and the maximum chroma within the range of the color reproduction area $GA_d$, becomes the maximum chroma of the projector 1

Subsequently, the chroma limit setting section 203 obtains the chroma of the optimal color corresponding to the lightness $L_t$* and the hue $H_t$* of the input color with reference to the optimal color data DC step S530). For example, in the case with the input color ($L_t$*, $H_t$*)=(a, b), the chroma $C_{max}$* (a, b) of the optimal color is obtained from the optimal color data DC shown in the part (c) of FIG. 8. In the example shown in FIG. 10, with respect to the color point P1, the chroma of the color point P2, which has the same lightness and hue as the color point P1 and located on the optimal color Lm, becomes the chroma of the optimal color.

Subsequently, the chroma limit setting section 203 compares the maximum chroma of the projector 1 obtained in the step S520 and the chroma of the maximum color obtained in the step S530 with each other, and sets one with a smaller value as the chroma limit $C_{lim}$* (step S540). In the example shown in FIG. 10, with respect to the color point P1 of the input color, the chroma of the color point P2 is smaller than the chroma of the color point P3, and consequently, the chroma of the color point P2, namely the chroma of the optimal color is set as the chroma limit $C_{lim}$*. Similarly, in the case with the color point P4 of the input color, since the chroma of the color point P5 taking the maximum chroma within the range of the color reproduction area is smaller than the chroma of the color point P6 on the optimal color Lm, the chroma of the color point P5, namely the maximum chroma of the projector 1 is set as the chroma limit $C_{lim}$*.

Subsequently, the first color correction table generation section 204 executes a chroma extension/compression process on the chroma $C_t$* of the input color within the range of the chroma limit $C_{lim}$* (step S550). Here, as shown in FIG. 3, by making the chroma $C_t$* "0 through $C_h$*" of the input color have a correspondence with the chroma $C_d$* "0 through $C_{lim}$*" of the output color so that the chroma $C_d$* monotonically increases to the chroma $C_t$*, and has one-to-one correspondence, the chroma $C_t$* is corrected into the chroma $C_d$*. Further, no correction is executed on the lightness $L_t$* and the hue $H_t$* of the input color, and the lightness $L_t$* and the hue $H_t$* are used respectively as the lightness $L_d$* and the hue $H_d$* of the output color. In other words, the input color $L_t$*/$C_t$*/$H_t$* is corrected into the output color $L_d$*/$C_d$*/$H_d$* (=$L_t$*/$C_d$*/$H_t$*). As the correction formula, for example, the following formula (19) is used. It should be noted that "Cth*" is a parameter defining the upper limit value of the chroma of the range in which the input color and the output color have the same chroma. In the formula, "α" is a parameter defining the characteristic of the shape of the curve, and is a coefficient defined so that the correction curve is convex downward when the chroma limit $C_{lim}$* is no smaller than the maximum chroma $C_h$* of the input color, and is convex upward when the chroma limit $C_{lim}$* is smaller than the maximum chroma $C_h$* of the input color. FIG. 3(a) shows the relationship between the chroma before the color correction and the chroma after the correction according to the first color correction table when the chroma limit $C_{lim}$* is no smaller than the maximum chroma $C_h^*$ of the input color, and FIG. 3(b) shows the relationship between the chroma before the color correction and the chroma after the correction according to the first color correction table when the chroma limit $C_{lim}^*$ is smaller than the maximum chroma $C_h^*$ of the input color. When the chroma limit $C_{lim}^*$ is no smaller than the maximum chroma $C_h^*$ of the input color, as shown in FIG. 3(a), the input color is extended in chroma along the correction curve convex downward. On the other hand, when the chroma limit $C_{lim}^*$ is smaller than the maximum chroma $C_h^*$ of the input color, as shown in FIG. 3(b), the input color is compressed in chroma along the correction curve convex upward.

[Formula 3]

$$C_d^* = \begin{cases} C_t^* & (C_{th}^* \geq C_t^*) \\ C_{th}^* + (C_{lim}^* - C_{th}^*) \times \left[\frac{(C_t^* - C_{th}^*)}{(C_{lim}^* - C_{th}^*)}\right]^{\alpha} & (C_{th}^* < C_t^*) \end{cases} \quad (19)$$

Subsequently, the first color correction table generation section 204 calculates the output color $R_d/G_d/B_d$ from the output color $L_d^*/C_d^*/H_d^*$ (step S560). Here, the output color $L_d^*/u_d^*/v_d^*$ is calculated from the output color $L_d^*/C_d^*/H_d^*$ by executing the color conversion along the following formulas (20) and (21), and further, the output color $R_d/G_d/B_d$ is calculated from the output color $L_d^*/u_d^*/v_d^*$ by executing the color conversion along the following formulas (22) through (30). Here, the matrix $M_d$ in the formula (27) is the chromaticity coordinate "$x_R/y_R/z_R, x_G/y_G/z_G, x_B/y_B/z_B, x_W/y_W/z_W$" of the color the projector outputs in response to the input value of red, green, blue, and white, respectively, and is obtained from the chromaticity coordinate of the color output characteristic data along the formulas (17) and (18). $Y_W$ is a lightness of white of the projector 1, and the lightness of the color output characteristic data is used as $Y_W$.

[Formula 4]

$$u^* = C^* \times \cos H^* \quad (20)$$

$$v^* = C^* \times \cos H^* \quad (21)$$

$$u' = u'_W + u^*/13L^* \quad (22)$$

$$v' = v'_W + v^*/13L^* \quad (23)$$

$$Y = \begin{cases} Y_W(L^*/903.3) & (L^* \leq 8.0) \\ Y_W((L^* + 16)/116)^3 - 16 & (L^* > 8.0) \end{cases} \quad (24)$$

$$X = Y \times (9u'/4v') \quad (25)$$

$$Z = Y \times ((36 - 9u' - 4v')/12v') \quad (26)$$

$$\begin{pmatrix} r \\ g \\ b \end{pmatrix} = M_d^{-1} \begin{pmatrix} X \\ Y \\ Z \end{pmatrix} \quad (27)$$

$$R = R_{max} \times r^{1/\gamma} \quad (28)$$

$$G = G_{max} \times g^{1/\gamma} \quad (29)$$

$$B = B_{max} \times b^{1/\gamma} \quad (30)$$

Subsequently, the first color correction table generation section 204 makes a correspondence between the input color $R_t/G_t/B_t$ and the output color $R_d/G_d/B_d$ to generate the first color correction table (step S570). The process of steps S510 through S570 described above is executed on the input color $R_t/G_t/B_t$ of all of the lattice points on the color gamut of the input color, and here, the first color correction table is generated by making a correspondence between the input color $R_t/G_t/B_t$ and the output color $R_d/G_d/B_d$ at every lattice point. When the first color correction table has been generated, the first color correction table generation process is terminated, and the process returns to the process shown in FIG. 5, in which the first color correction table generation section 204 stores the first color correction table thus generated in the first color correction table storage section 211 (practically, the flash memory 23) (step S600).

Subsequently, in the step S700, whether or not the process has been completed for all of the color modes is judged. If the process has not yet completed for all of the color modes (No, in the step S700), the process returns to the step S100 to select the color modes not yet executed, and then the process for generating the first color correction table corresponding to the selected color mode is executed. It should be noted although in the explanations described above the case in which the color gamut priority mode is selected in the step S100 is explained, if the color priority mode or the brightness priority mode, for example, is selected, the maximum chroma of the projector 1 is obtained using the target color gamut of the selected mode instead of the color reproduction area in the step S520, and then the process of the steps S100 through S600 is executed similarly to the case with the color gamut priority mode. If the process has been completed for all of the color modes (Yes in the step S700), the process shown in the flowchart of FIG. 5 is terminated.

By executing the first color correction table generation process described above, the first color correction table is stored in the first color correction table storage section 211. Here, a color gamut alteration caused by the chroma extension/compression along the first color correction table will be explained. FIG. 11 is a diagram showing an example of the color gamut before and after the correction along the first color correction table for the color gamut priority mode on the L*C*-plane. In the drawing, "$GA_{lim}$" is the color gamut after the correction along the first color correction table, namely the color gamut limited to the chroma no greater than the chroma limit. As shown in FIG. 11, the color gamut $GA_t$ of the input color is corrected into the color gamut $GA_{lim}$ (the color gamut illustrated with a bold line in FIG. 11) in the area where the color gamut in the optimal color Lm and the color reproduction are $GA_d$ overlap with each other.

Here, since the value of smaller one of the chroma of the optimal color and the maximum chroma of the projector 1 is set to the chroma limit, the color on the outermost shell of the color gamut $GA_{lim}$ is corrected into the color, which is one with smaller chroma out of the optimal color $L_m$ and a color on the outermost shell of the color reproduction area $GA_d$ of the projector 1, and has the same lightness and the same hue. In other words, in the example shown in FIG. 11, as the color "P1" on the outermost shell of the color gamut $GA_t$ of the input color is corrected into the color "P2" of the optimal color $L_m$, regarding the range in which the chroma of the optimal color is smaller than the maximum chroma of the projector 1, the color gamut $GA_t$ of the input color is extended in chroma to the optimal color $L_m$. On the other hand, as the color "P4" on the outermost shell of the color gamut $GA_t$ of the input color is corrected into the color "P5" on the outermost shell of the color reproduction area $GA_d$, regarding the range in which the maximum chroma of the projector 1 is smaller than the chroma of the optimal color, the chroma thereof is extended to the maximum chroma of the projector 1, namely the color on the outermost shell of the color reproduction area $GA_d$. As a result, according to the first color correction table, the color matching, in which the color gamut $GA_t$ of the input color is extended in chroma to the color gamut $GA_{lim}$ (the color gamut illustrated with a bold line in FIG. 11) limited to the chroma no greater than the chroma limit while extending the color gamut $GA_t$ of the input color to be closer to the color reproduction area $GA_d$, is possible. Similarly, in the color priority mode or the brightness priority mode, the color matching is executed into the color gamut including the area in which the color gamut in the optimal color $L_m$ and the target color gamut of each of the color modes overlap with each other.

Then, the process of the projector 1 displaying an image in response to input of image data will hereinafter be explained along the flowchart shown in FIG. 12. It should be noted that the process shown in FIG. 12 is executed by the CPU 21 executing the image processing program stored in the flash memory 23.

When the image data is input from an external apparatus to the image data input section 10, the process shown in FIG. 12 is started. When starting the process, the image data input section 10 executes the input process on the image data input from the external apparatus (step S800). For example, in the case in which the image processing section 20 processes the RGB data composed of 8 bits for each color, the image data from the external apparatus is converted into the input values $R_{in}/G_{in}/B_{in}$ composed of 8 bits for each color of R, G, and B in the input process, and transfers the input value $R_{in}/G_{in}/B_{in}$ to the image processing section 20.

Subsequently, the first color correction execution section 214 sets the color mode (step S810). The color mode is set in accordance with, for example, the color mode selection operation by the user or the type of the image data input thereto.

Subsequently, the color correction table selection section 213 selects the first color correction table corresponding to the color mode thus set out of a plurality of first color correction tables stored in the first color correction table storage section 211. Then, the first color correction execution section 214 retrieves the selected first color correction table from the first color correction table storage section 211 (practically, from the flash memory 23) (step S820).

Subsequently, the first color correction execution section 214 executes the three-dimensional color correction on the input values $R_{in}/G_{in}/B_{in}$ of the image data input from the image data input section 10 according to the first color correction table, thereby correcting it into the R/G/B values limited to the chroma no greater than the chroma limit (step S830). Here, the input values $R_{in}/G_{in}/B_{in}$ on the lattice point of the first color correction table is corrected along the correspondence of the color represented in the first color correction table, while the input values $R_{in}/G_{in}/B_{in}$ out of the lattice point is corrected with the value obtained by interpolating the values on the lattice points.

Subsequently, the color correction table selection section 213 selects the second color correction table corresponding to the color mode thus set out of a plurality of second color correction tables stored in the second color correction table storage section 212. Then, the second color correction execution section 215 retrieves the selected second color correction table from the second color correction table storage section 212 (step S840).

Subsequently, the second color correction execution section 215 executes the one-dimensional color correction on each of the colors with the R/G/B values corrected by the step S830 along the second color correction table, thereby correcting it into the R/G/B values having the gray-scale characteristics adjusted in accordance with the device characteristic of the liquid crystal panel 40 (step S850).

Subsequently, the second color correction execution section 215 executes the output process in which the R/G/B values corrected by the step S850 is output to the L/V drive section 30 as the output values $R_{out}/G_{out}/B_{out}$ (step S860). The L/V drive section 30 drives the liquid crystal panel 40 along the output values $R_{out}/G_{out}/B_{out}$ to display the image thereon, thereby projecting and displaying the image of the liquid crystal panel 40 on the screen. Thus, the image expressed with colors on the color gamut $GA_{lim}$ limited to the chroma no greater than the chroma limit is projected to be displayed.

According to the projector 1 of the first embodiment, the following advantages can be obtained.

(1). According to the first color correction table, since the color gamut $GA_t$ of the input color is converted into the color gamut $GA_{lim}$ limited to the chroma no greater than the chroma limit, the color matching with the chroma extended to the chroma limit can be executed. Since the chroma extension is controlled to be smaller than the chroma of the chroma limit, an image with preferred colors can be displayed without excessively emphasizing the chroma.

(2). In the color gamut priority mode, since the chroma is extended so as to match the color gamut $GA_t$ of the input color with the color reproduction area $GA_d$ of the projector 1 while suppressing the excessive emphasis of the chroma, colorful display making the most use of the large color reproduction area $GA_d$ of the projector 1 becomes possible. Since the display device becomes possible to display an image with preferred colors while suppressing excessive emphasis of the chroma providing the display device has large color reproduction area by using the LED light source as the projector 1 of the present embodiment, it is especially useful. Further, even if the target color gamut is out of the color reproduction area $GA_d$ of the projector 1 in the color priority mode or the brightness priority mode, an image with preferred colors can be displayed while suppressing the excessive emphasis of the chroma.

(3). Since it is arranged that the chroma limit is determined by the optimal color, which is the theoretical limit of the object color, even if the color reproduction area $GA_d$ is a so large color gamut as to include a color, which does not normally exist in nature, it is possible to display an image with natural colors within the range of the object colors existing in nature by executing the color matching by the first color correction table. Therefore, even in the projector 1 provided with a large color reproduction area, it becomes possible to display an image with natural colors while preventing display with unnatural colors.

(4). Since it is arranged that when the chroma of the color reproduction area $GA_d$ is smaller than the chroma of the optimal color Lm in certain lightness and hue, the chroma is extended to the chroma of the color reproduction area $GA_d$, matching to the color the projector 1 does not reproduce can be eliminated, thus it becomes possible to display an image with appropriate colors corresponding to the color output characteristic of the projector 1. Therefore, the preferred colors with suppressed excessive emphasis of the chroma can be output regardless of the size of the color reproduction area.

(5). Since the spectral characteristic of the light source and a number of spectral reflectance characteristics to be the candidates for obtaining the optimal color are assumed, and the limit of the object color obtained from the spectral characteristic of the light source and the number of spectral reflectance characteristics is used as the optimal color, the optimal color can be obtained by relatively simple calculation. Further, since it is arranged that the object colors corresponding to the spectral reflectance characteristics of all of the combinations of the wavelengths $\lambda_1$ and $\lambda_2$ included in the visible area, and the optimal color is obtained from all of the object colors thus calculated, the optimal color can be obtained accurately. Thus, the display of unnatural colors exceeding the chroma of the optimal color can surely be eliminated.

(6). As shown in FIG. 3, since the correction (chroma extension/compression) is executed on the maximum chroma of the input color so as to match with the chroma limit, and on the chroma other than the maximum chroma along the correction curve varying continuously, the color smoothly reproducing the alteration of the chroma of the input color can be output. Further, since the chroma $C_r^*$ of the input color is set equal to the chroma $C_d^*$ of the output color in the area no greater than the threshold value $C_{th}^*$, it is possible to execute the color reproduction faithful to the image data input thereto in the smaller chroma area while preventing the excessive emphasis of the chroma exceeding the chroma limit in the greater chroma area.

(7). According to the second color correction table, since the adjustment is executed so as to be a predetermined characteristic (e.g., the gamma characteristic or the color temperature of the white point) in accordance with the device characteristic of the liquid crystal panel 40, it is possible to reflect the preferred color, on which the color correction along the second color correction table has been executed, to the projection image regardless of the device characteristic of the liquid crystal 40.

Second Embodiment

A second embodiment according to the invention will hereinafter be described.

In the second embodiment, a color correction system for executing the color correction on the projector will be explained. FIG. 13 is a block diagram showing a configuration of the color correction system according to the second embodiment. It should be noted that in the following explanation, the same constituents as in the first embodiment are denoted with the same reference numerals, and detailed explanations therefor will be omitted.

As shown in FIG. 13, the color correction system 2 is provided with a projector 3 and a color correction device 4 for correcting the color output by the projector 3, and the projector 3 and the color correction device 4 are connected to each other so as to be able to communicate with each other.

The projector 3 is provided with an image data input section 10, an image processing section 20, and an L/V drive section 30. Further, the image processing section 20 includes a first color correction table storage section 211, a first color correction execution section 214, a second color correction table storage section 212, and a second color correction execution section 215. In other words, the projector 3 has a configuration as the color correction section 210 of the projector 1 according to the first embodiment.

The color correction device 4 is provided with a color output characteristic data storage section 201, a optimal color data generation section 202, a chroma limit setting section 203, a first color correction table generation section 204, a second color correction table generation section 205, and an optical sensor 206. In other words, the color correction device 4 has the optical sensor 206 in addition to the configuration as the color correction table generation section 200 of the projector 1 according to the first embodiment. The color correction device 4 stores the data representing the color output characteristic of the projector 3 measured by the optical sensor 206 in the color output characteristic data storage section 201, and at the same time, the second color correction table generation section 205 outputs the second color correction table generated using the color output characteristic data to the projector 3, to make the second color correction table storage section 212 of the projector 3 store the second color correction table. The first color correction table generation section 204 generates the first color correction table using the color output characteristic data by executing the same process as the first color correction table generation process shown in FIG. 5. Then, the first color correction table generation section 204 outputs the first color correction table to the projector 3, and makes the first color correction table storage section 211 of the projector 3 store the first color correction table. Thus, the color correction device 4 applies the first color correction table and the second color correction table to the projector 3 to correct the color output characteristic of the projector 3 so that the image with the chroma no greater than the chroma limit can be output.

Therefore, according to the second embodiment, the color correction device 4 can generate the first color correction table capable of obtaining the advantage (1) through advantage (7) according to the first embodiment, and at the same time, controls the color output of the projector 3 so as to realize the advantage (1) through advantage (7) by storing the first color correction table thus generated in the first color correction table storage section 211 of the projector 3.

Third Embodiment

A third embodiment according to the invention will hereinafter be described.

Although in the first embodiment, as shown in FIG. 7, the optimal color is obtained assuming the convex-shaped of the concave-shaped spectral reflectance characteristic in which the reflectance is changed from 100% to 0% or from 0% to 100% at the wavelengths $\lambda_1$ and $\lambda_2$, in the third embodiment, "the limited optimal color" is calculated by executing the same process as the optimal color calculating method of the first embodiment assuming the spectral reflectance characteristic continuously varying around the wavelengths $\lambda_1$ and $\lambda_2$. This is for approximating the characteristic to the characteristic in nature, because the object existing in nature usually has the spectral characteristic with continuous reflectance. In other words, the limited optimal color represents the limit of colors more likely existing in nature compared to the optimal color.

FIG. 14 shows an example of the spectral reflectance characteristic changing continuously. As shown in FIG. 14, the reflectance changes continuously in the wavelength band of "$\lambda_1-\Delta\lambda$ through $\lambda_1+\Delta\lambda$" taking the wavelength $\lambda_1$ as the central wavelength having the reflectance of 50%. In the drawing, "$\Delta\lambda$" is a value defining the width of the wavelength band in which the characteristic changes continuously. The shape of the spectral reflectance characteristic is defined, for example, by the following formula (31). Similarly, by defining the spectral reflectance characteristic so that the reflectance changes continuously also in the wavelength band having the wavelength $\lambda_2$ as the center thereof, the spectral reflectance pattern A with a substantially convex shape can be set. Regarding the spectral reflectance pattern B, in a similar manner, the substantially convex-shaped spectral reflectance characteristic changing continuously is set. By executing a process similar to the optimal color data generation process in the first embodiment using the spectral reflectance patterns A, B set in a manner described above, the chroma should further be limited compared to the optimal color, and the limited optimal color can be obtained. Regarding the method of generating the first color correction table using the limited optimal color, the first color correction table is generated in a similar manner to the first color correction table generation process in the first embodiment using the limited optimal color instead of the optimal color.

[Formula 5]

$$R(\lambda) = \begin{cases} \frac{1}{2}\left(\frac{\lambda - \lambda_1 + \Delta\lambda}{\Delta\lambda}\right)^{\gamma} & (\lambda - \Delta\lambda \leq \lambda < \lambda_1) \\ \frac{1}{2}\left(2 - \left(\frac{\lambda_1 + \Delta\lambda - \Delta\lambda}{\Delta\lambda}\right)^{\gamma}\right) & (\lambda_1 \leq \lambda < \lambda + \Delta\lambda) \end{cases} \quad (31)$$

According to the third embodiment, since the chroma limit is set using the limited optimal color having chroma more limited in comparison with the optimal color, the first color correction table capable of color matching to more natural colors can be generated. By executing the color correction along the present first color correction table, color matching to more natural and preferred colors can be performed.

Although the first through third embodiment of the invention are hereinabove explained, the invention is not limited to these embodiments, but can take various forms. Such modified examples of the invention will hereinafter be explained.

Modified Example 1

Although in the first through third embodiments, it is arranged that the optimal color data DC is generated when generating the first color correction table, it is also possible that the optimal color data DC is previously calculated prior to the process for generating the first color correction table, and that the first color correction table is generated using the previously calculated optimal data DC.

Modified Example 2

Although in the first through third embodiments described above, the chroma limit is set to the chroma C* on the L*C*H* space, it is also possible to set the chroma limit to the chroma S on the HSI color space. Further, it is also possible to arrange that the chroma extension/compression is executed on the L*C*H* color space obtained from the L*/a*/b* values of the input color.

Modified Example 3

Although in the first through third embodiments, the LED is used as the light source, the type of the light source is not limited thereto, and there can also be adopted a configuration in which a large color reproduction area is realized using a laser or an organic electroluminescence (EL) element as the light source. It should be noted that the invention can be applied to a display device using a lamp light source such as a high-pressure mercury lamp or a metal halide lamp in the case with a projector, or a cold-cathode tube in the case with a liquid crystal display. Since in these cases the color reproduction area becomes narrower in comparison with the display device with a large color reproduction area, the probability of being processed with the chroma compression shown in FIG. 3(b) rises.

Modified Example 4

It is also possible to adopt a configuration in which the projector 1 is provided with an optical sensor for measuring the color output characteristic, a predetermined image for measuring the color output characteristic is displayed with predetermined timing even outside the manufacturing period to make the optical sensor measure the color output characteristic, and the data of the color output characteristic thus measured is stored in the color output characteristic data storage section 201. On this occasion, even if the color output characteristic changes with time after manufacturing of the projector 1, for example, an appropriate color correction can be performed in accordance with the color output characteristic after the alteration by measuring the color output characteristic after the alteration to generate the color correction table.

Modified Example 5

It is also possible that in the first embodiment, the chroma with a predetermined proportion (e.g., 90%) of the chroma of the optimal color is set as the chroma limit.

Modified Example 6

Although in the first through third embodiments, the case in which the invention is applied to the front projector as the display device is explained, the invention can also be applied to a rear projector, a DLP (registered trademark), a liquid crystal display, an organic EL display, a plasma display, a cathode-ray tube (CRT), a field emission display (FED), or a surface-conduction electron-emitter display (SED). Further, it is also possible that the invention is applied to a system having a personal computer (an image processing device) and a display device such as a liquid crystal display connected to each other, and the personal computer performs the color correction for limiting the chroma to be no greater than the chroma limit to output the image data with the correction to the liquid crystal display. Further, the image processing method according to the invention can also be applied to a device such as a printer executing the color matching inside thereof.

BRIEF DESCRIPTION OF THE DRAWINGS

FIG. 1 is a block diagram showing a configuration of a projector according to a first embodiment.
FIG. 2 is a block diagram showing a hardware configuration of the projector.
FIG. 3 is a diagram for explaining chroma extension/compression by first color correction, wherein (a) is a diagram showing chroma extension while (b) is a diagram showing chroma compression.
FIG. 4 is a diagram for explaining second color correction.
FIG. 5 is a flowchart showing flow of a process executed by an image processing section.
FIG. 6 is a flowchart showing flow of a optimal color data generation process.
FIG. 7 is a diagram showing a spectral reflectance characteristic, wherein (a) is a diagram showing a spectral reflectance pattern A while (b) is a diagram showing a spectral reflectance pattern B.

[FIG. 8]
FIG. 8 is an explanatory diagram for explaining a calculation method of the optimal color.
FIG. 9 is a flowchart showing flow of a first color correction table generation process.
FIG. 10 is a diagram showing an example of a color reproduction area and the optimal color of the projector.
FIG. 11 is a diagram showing a change in color gamut by the chroma extension/compression according to the first color correction table.
FIG. 12 is a flowchart showing flow of a process when the color correction is executed.
FIG. 13 is a block diagram showing a configuration of a color correction system according to a second embodiment.
FIG. 14 is a diagram showing a spectral reflectance characteristic according to a third embodiment.

DESCRIPTION OF REFERENCE NUMERALS AND SIGNS

Figure 1:
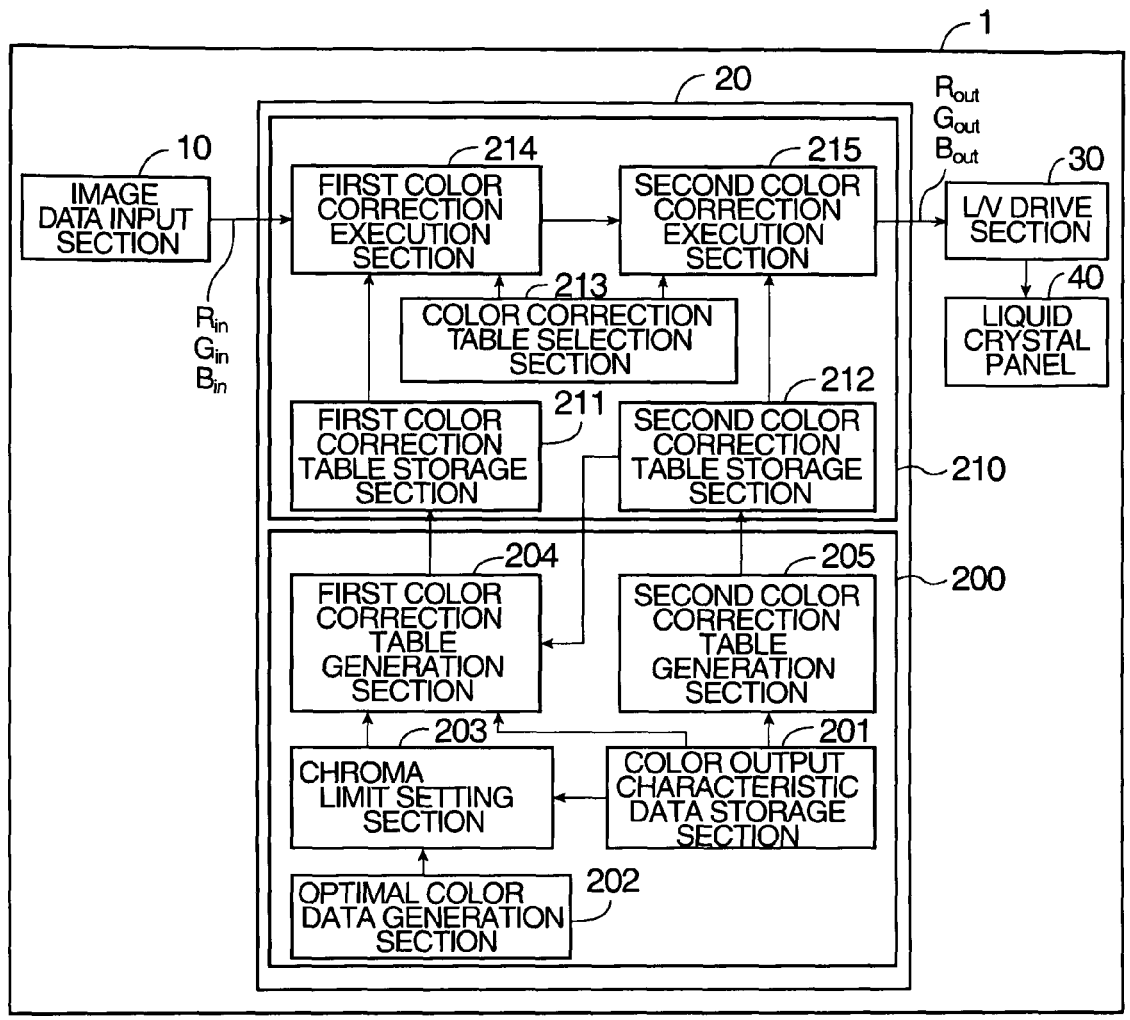
[FIG. 1]
Figure 2:
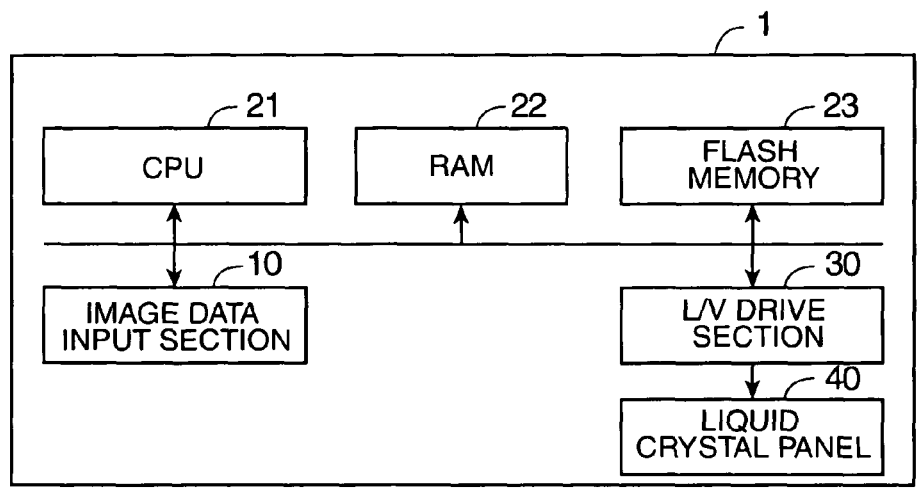
[FIG. 2]
Figure 3A:
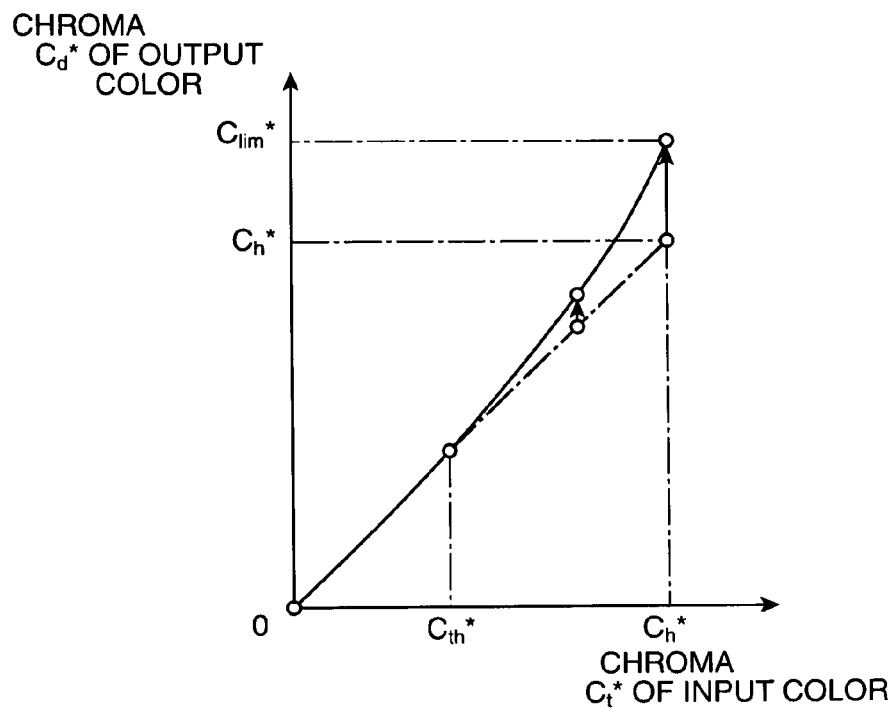
[FIG. 3]
Figure 3B:
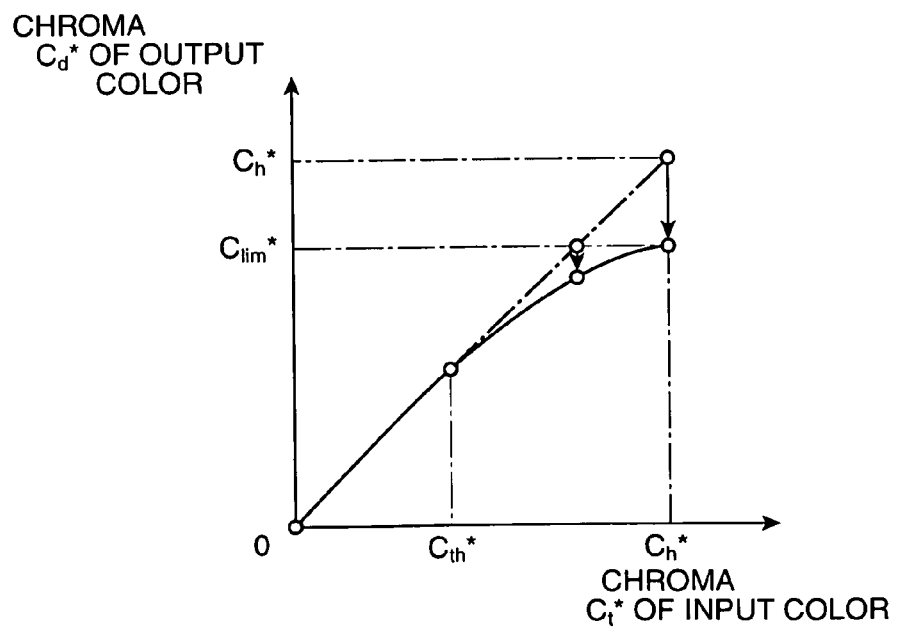
Figures 4A, 4B, 4C:
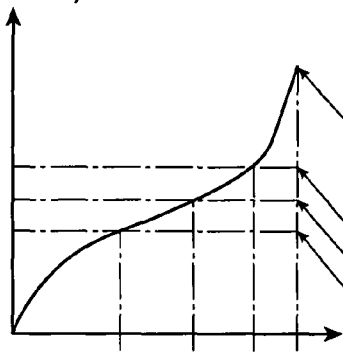
[FIG. 4]
Figure 5:
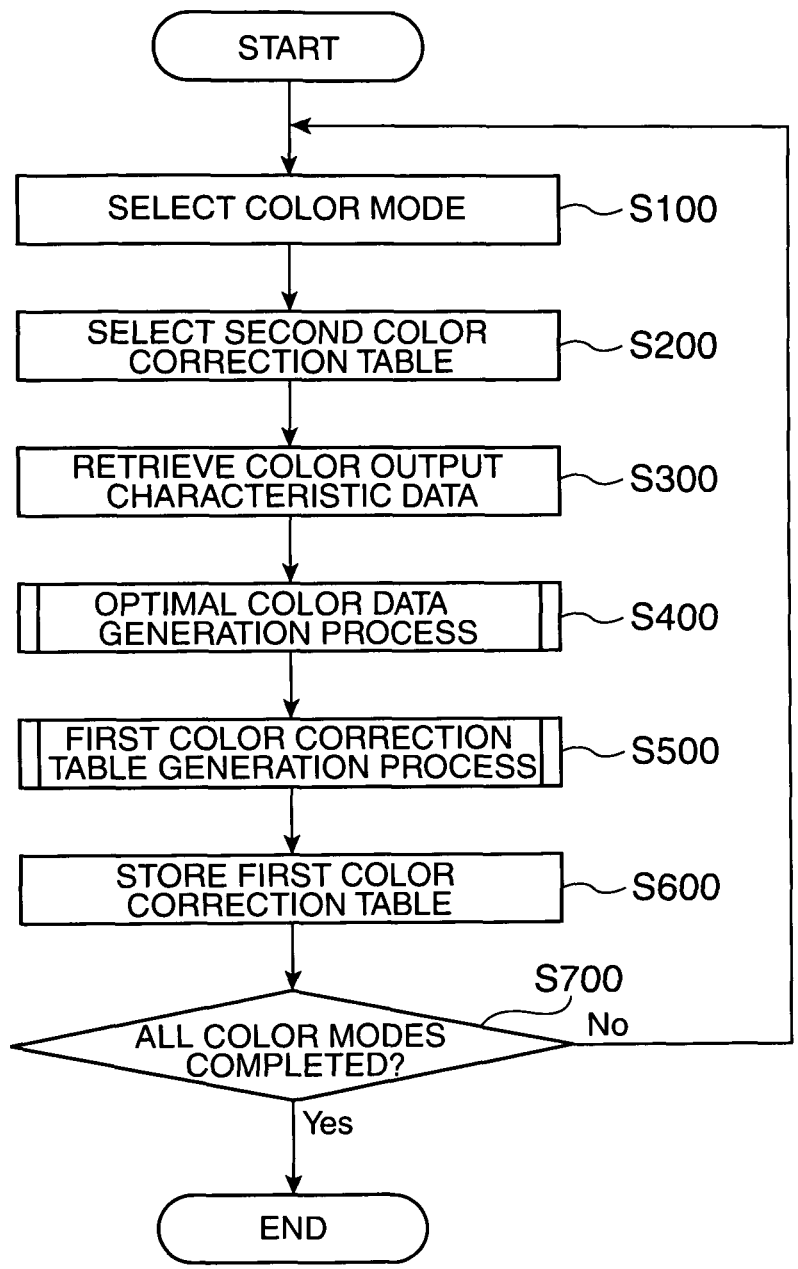
[FIG. 5]
Figure 6:
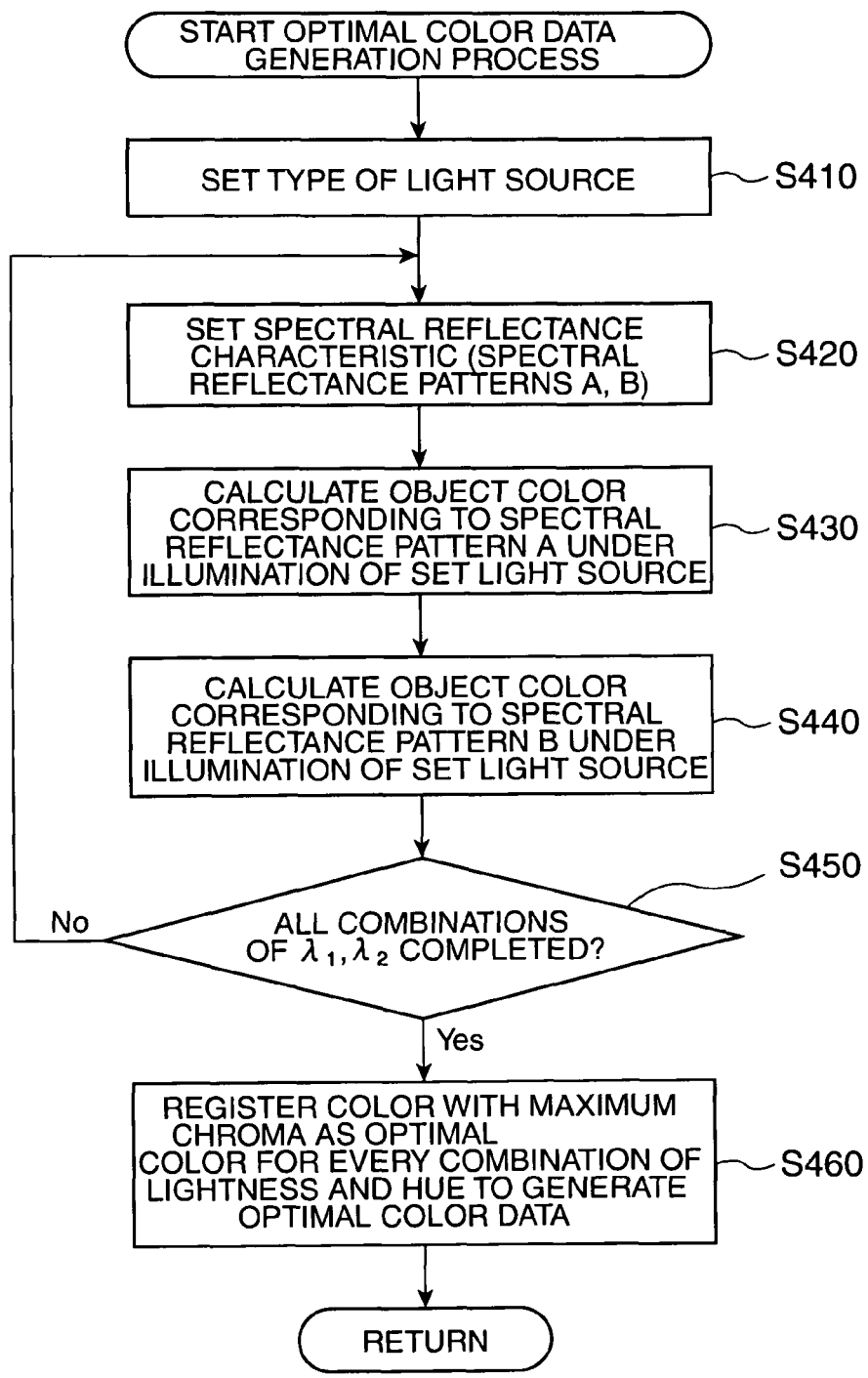
[FIG. 6]
Figure 7A:
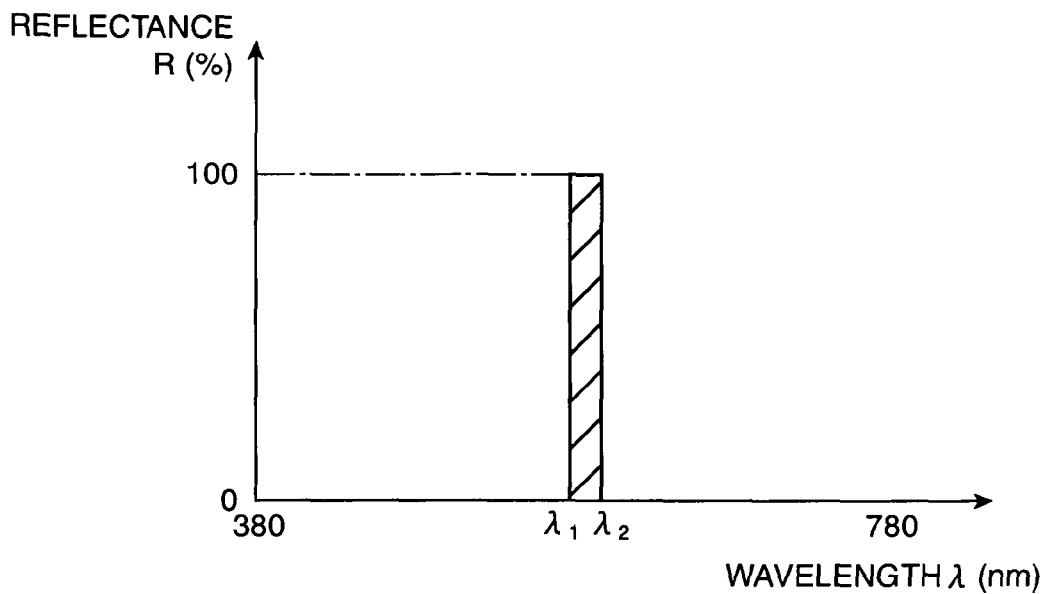
[FIG. 7]
Figure 7B:
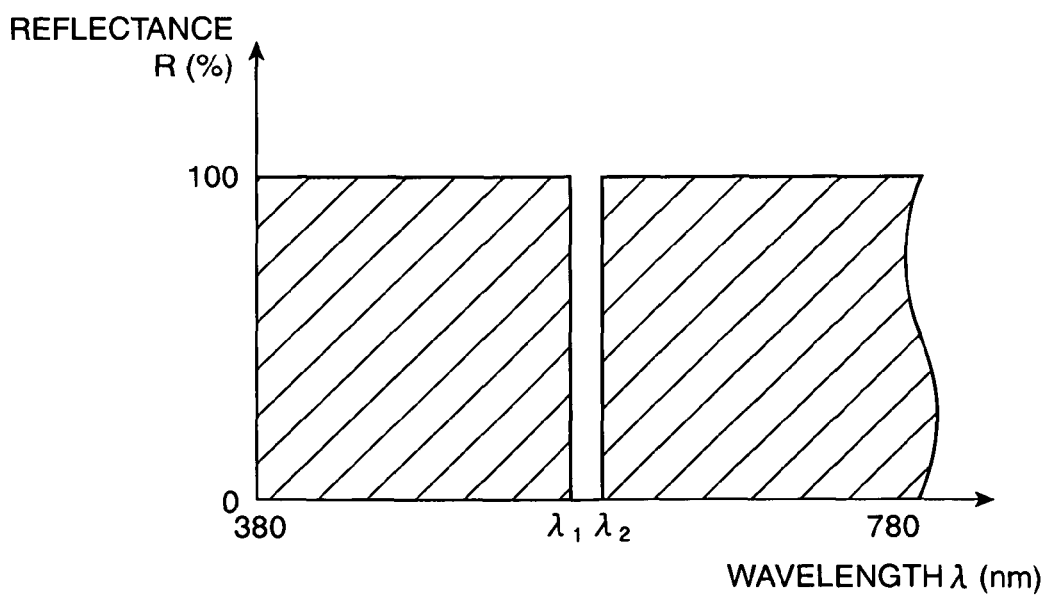
Figure 9:
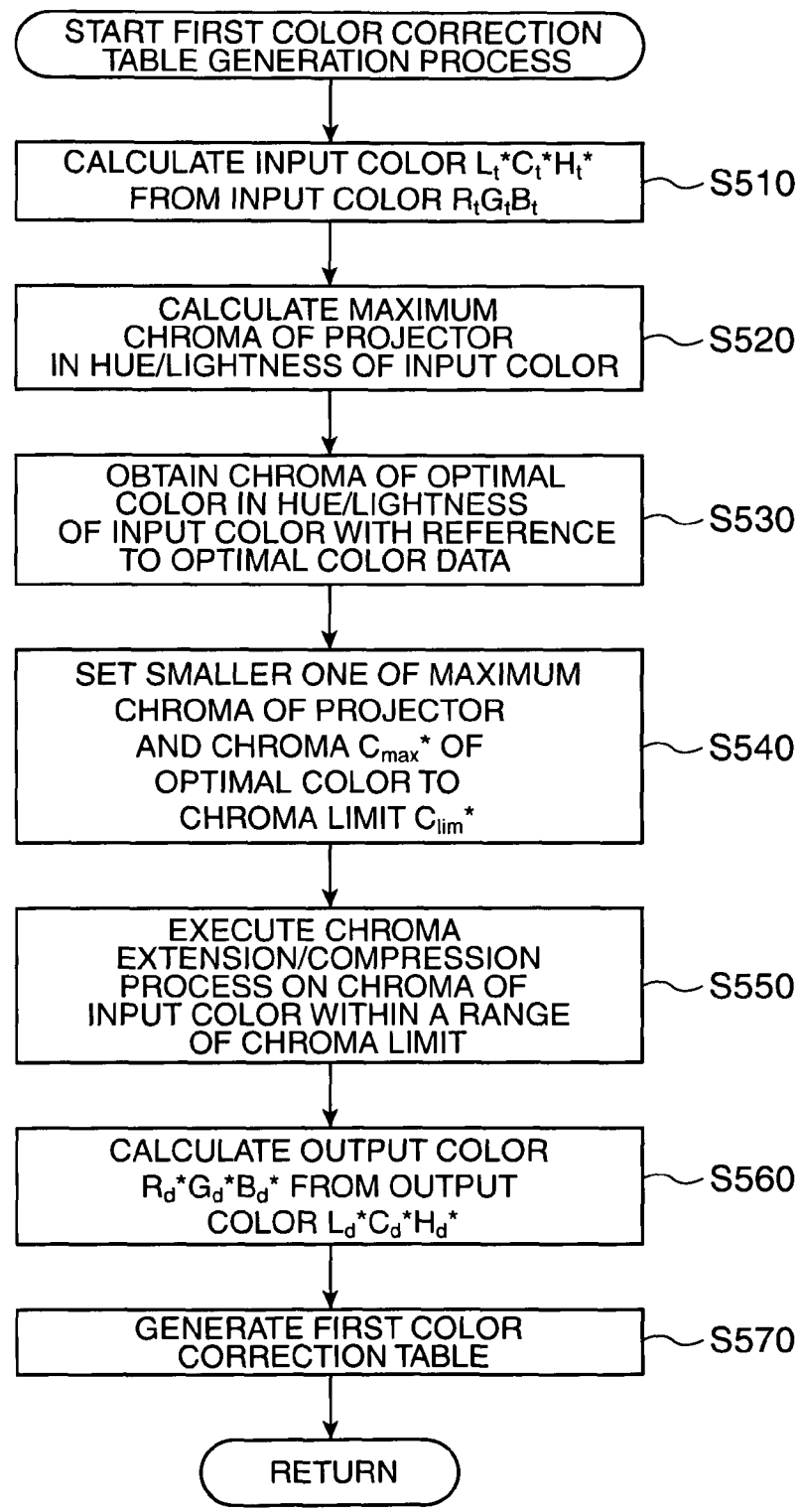
[FIG. 9]
Figure 10:
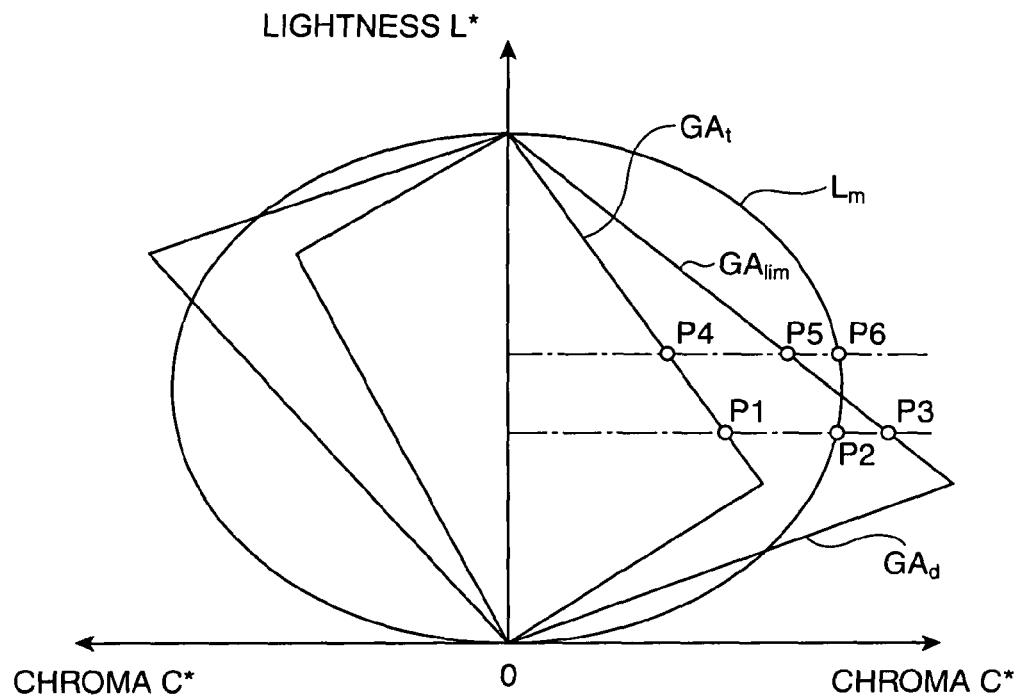
[FIG. 10]
Figure 11:
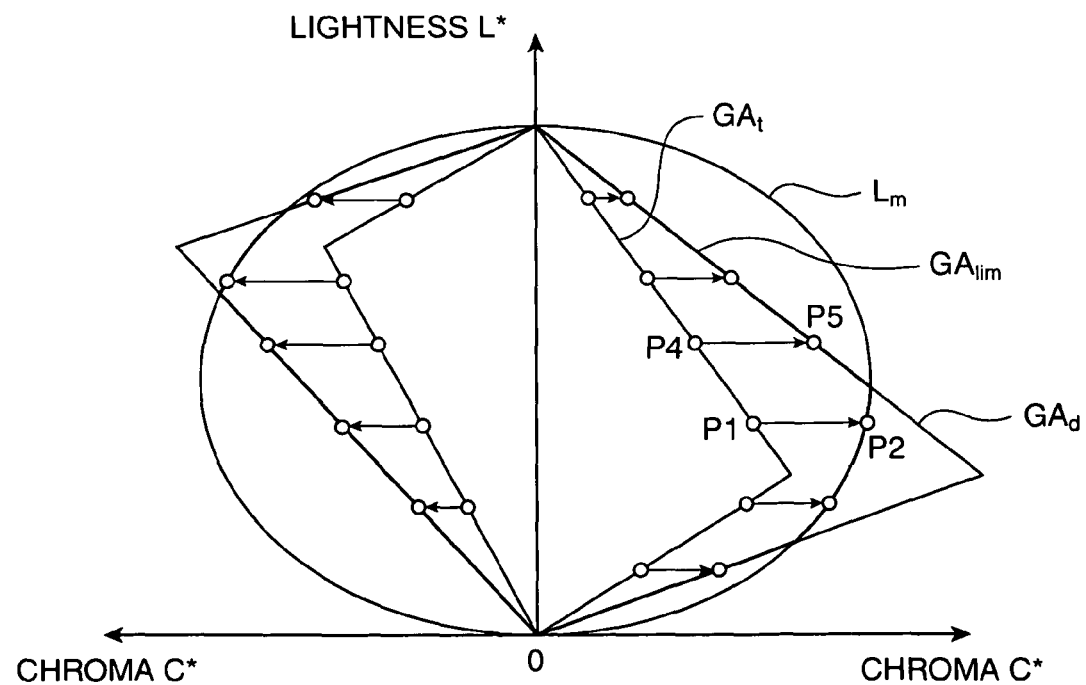
[FIG. 11]
Figure 12:
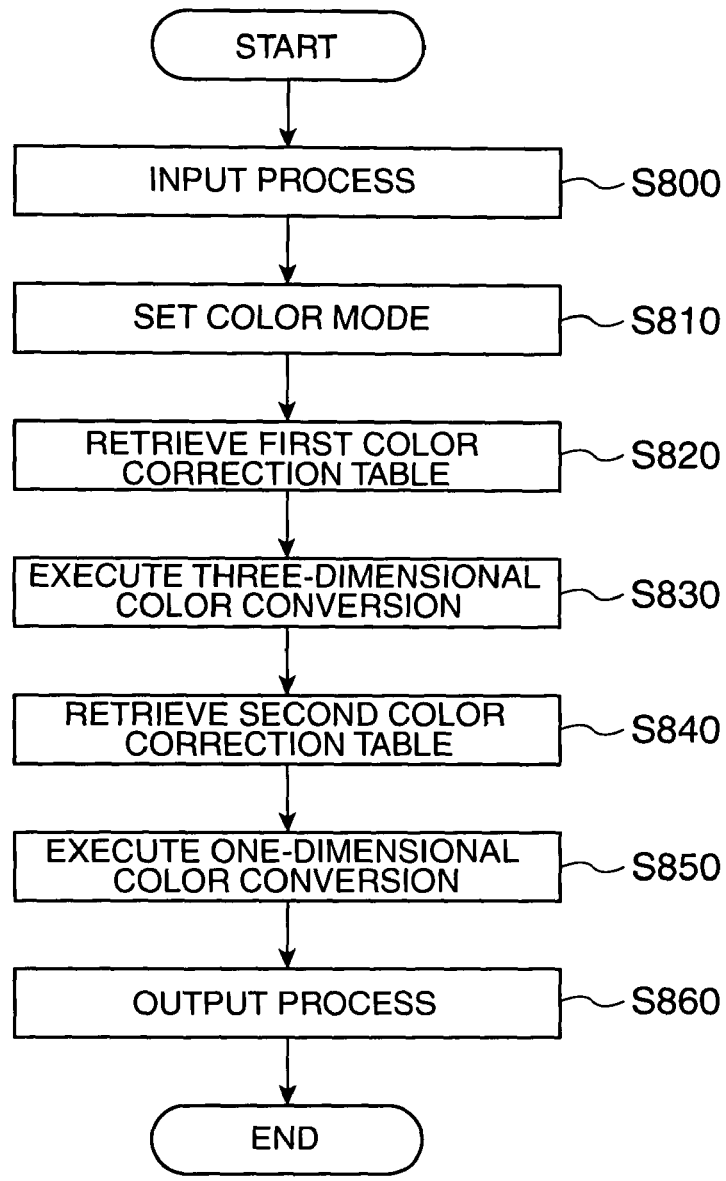
[FIG. 12]
Figure 13:
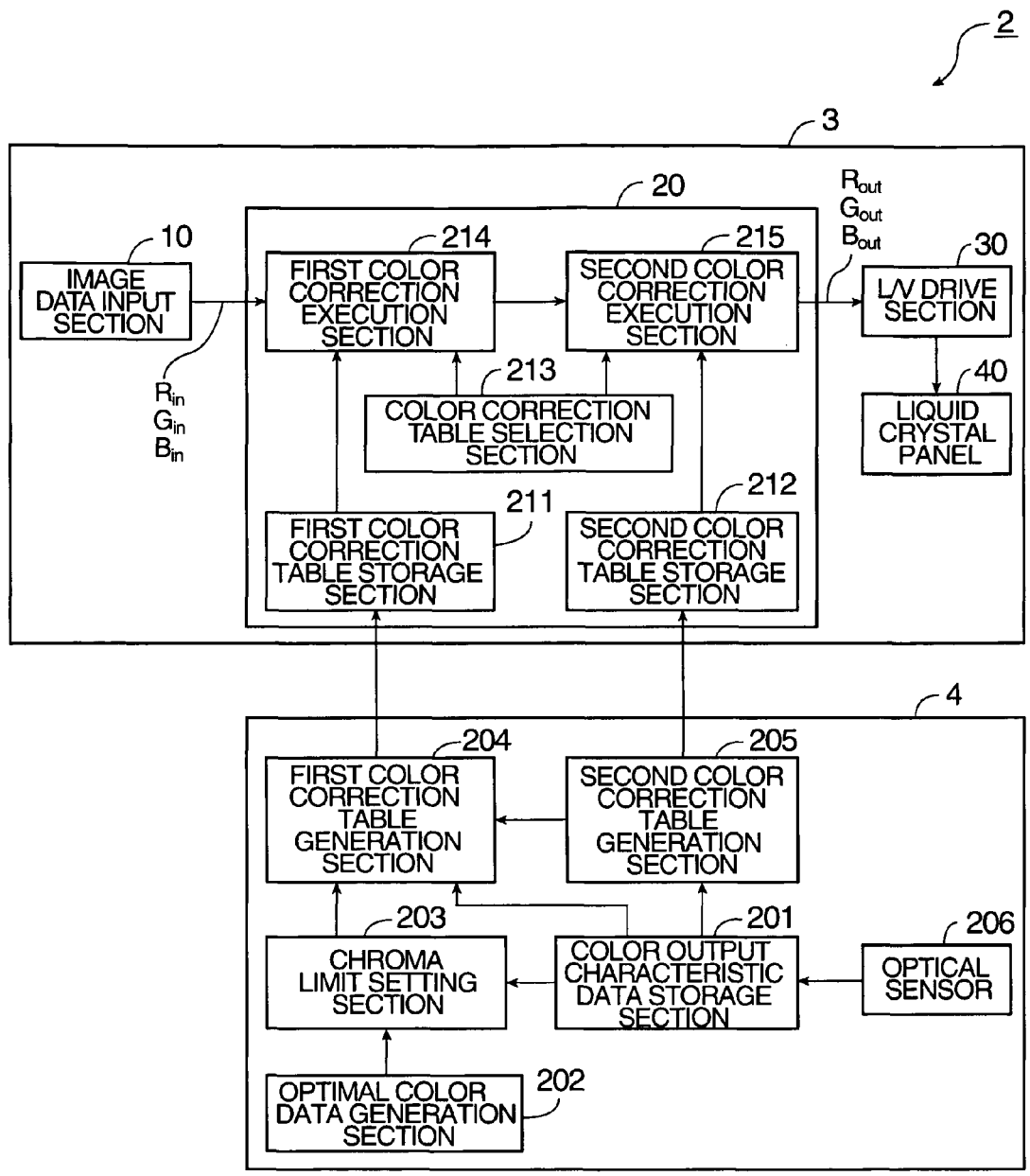
[FIG. 13]
Figure 14:
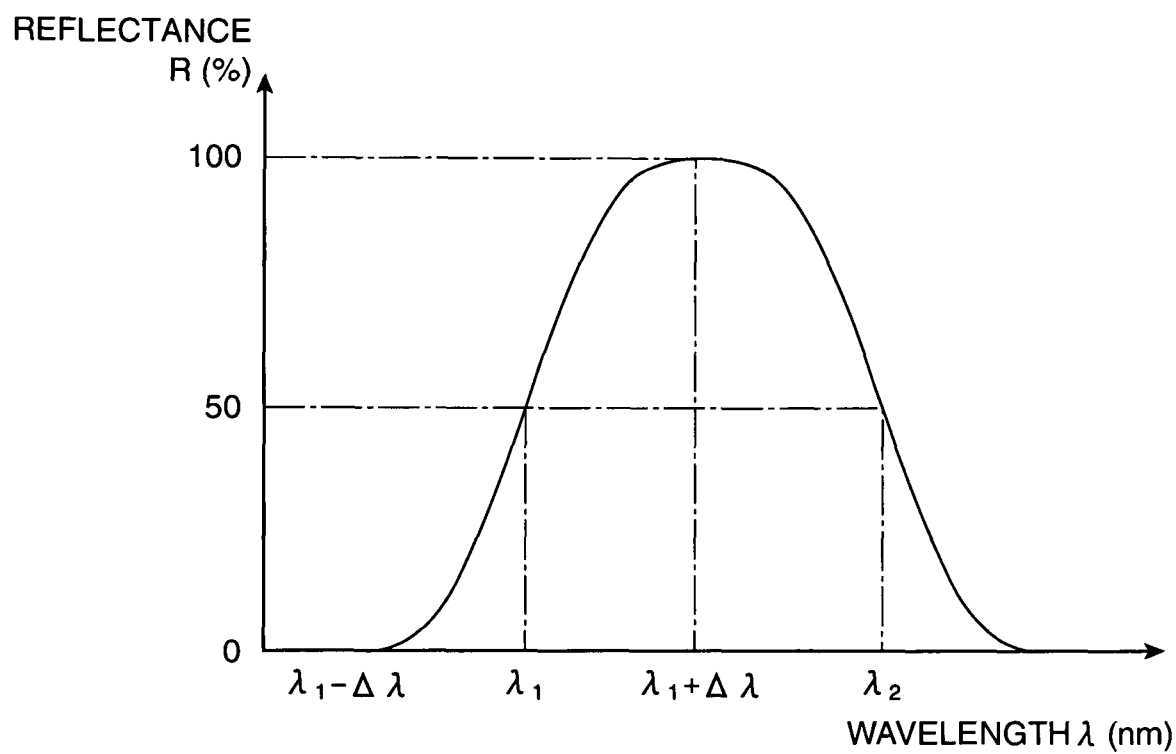
[FIG. 14]

1: projector as a display device
2: color correction system
3: projector as a display device
4: color correction device as a color correction table
10: image data input section as an input section
20: image processing section
30: L/V drive section
40: liquid crystal panel as a display section
21: CPU
22: RAM
23: flash memory as a storage section
200: color correction table generation section as a color correction table generation device
201: color output characteristic data storage section
202: optimal color data generation section as optimal data generation means
203: chroma limit setting section as chroma limit setting means
204: first color correction table generation section as color correction table generation means
205: second color correction table generation section
206: optical sensor
210: color correction section as an image processing device
211: first color correction table storage section
212: second color correction table storage section
213: color correction table selection section
214: first color correction execution section
215: second color correction execution section
DA, DB: object color data
DC: optimal color data
$GA_i$: color gamut of input color as a first color gamut
$GA_d$: color reproduction area of a projector as a second color gamut
$GA_{lim}$: color gamut limited to chroma no greater than the chroma limit as a third color gamut
$L_m$: line connecting the color points of the optimal color

The invention claimed is:

1. An image processing device for executing color correction on an input color in a first color gamut into an output color in a second color gamut, comprising:
a color correction table having a correspondence between the input color in the first color gamut and a color in a third color gamut within a range of the second color gamut and having chroma limited to be no greater than a chroma limit defining an upper limit of the chroma of the output color, the color correction table having a correspondence between an input color on an outermost shell of the first color gamut and a color having a same lightness and a same hue as those of the input color and a chromaticness of the chroma limit; and
a color correction device that executes color correction for converting the input color in the first color gamut with reference to the color correction table to determine the converted input color as the output color.

2. A display device comprising:
an input section to which image data is input;
the image processing device according to claim 1 that corrects an input color of the input image data; and
a display section that displays an image of the input image data based on an output color corrected by the image processing device,
wherein the first color gamut is a color gamut of the input image data.

3. A color correction table generation device for generating a color correction table for executing a color correction on an input color in a first color gamut into an output color in a second color gamut, comprising:
a chroma limit setting device that sets a chroma limit based on chroma of an optimal color, the chroma limit setting device setting a smaller one of the chroma of the optimal color and a maximum chroma in the second color gamut as the chroma limit under a condition of a same lightness and a same hue; and
a color correction table generation section that generates a color correction table by making a correspondence between the input color in the first color gamut and a color in a third color gamut within a range of the second color gamut and having chroma limited to be no greater than a chroma limit defining an upper limit of the chroma of the output color.

4. The color correction table generation device according to claim 3, further comprising:
an optimal color data generation device that sets a plurality of spectral reflectance characteristics as candidates of a spectral reflectance characteristic for obtaining a spectral characteristic of a supposed light source and the optimal color, calculates an object color for each of the plurality of spectral reflectance characteristics based on a present spectral reflectance characteristic and the spectral characteristic of the light source, selects a color having the maximum chroma out of the plurality of object colors having a same lightness and a same hue, and determines the selected color as the optimal color, thereby generating the optimal color data representing the optimal color,
wherein the chroma limit setting device sets the chroma limit with reference to the optimal color data.

5. The color correction table generation device according to claim 4, wherein
each of the plurality of spectral reflectance characteristics has a spectral reflectance in a visible band having spectral characteristic having one of a convex shape and a concave shape defined by a first wavelength at which the reflectance changes from 0% to 100% and a second wavelength at which the reflectance changes from 100% to 0%, and the plurality of spectral reflectance characteristics is set by a plurality of combinations of the first wavelength and the second wavelength.

6. The color correction table generation device according to claim 5, wherein
the plurality of combinations of the first wavelength and the second wavelength includes all of the combinations of wavelengths included in the visible band.

7. The color correction table generation device according to claim 3, further comprising:
an optimal color data generation device that sets a spectral characteristic of a supposed light source, sets a plurality of spectral reflectance characteristics in a visible band having spectral characteristic having one of a substantially convex shape and a substantially concave shape defined by a first wavelength at which the reflectance changes continuously from 0% to 100% and a second wavelength at which the reflectance changes continuously from 100% to 0% in accordance with a plurality of combinations of the first wavelength and the second wavelength, calculates an object color for each of the plurality of spectral reflectance characteristics based on a present spectral reflectance characteristic and the spectral characteristic of the light source, selects a color having the maximum chroma out of the plurality of object colors having a same lightness and a same hue, and determines the selected color as a limited optimal color, thereby generating the optimal color data representing the limited optimal color,
wherein the chroma limit setting device sets the chroma limit based on the limited optimal color with reference to the optimal color data.

8. The color correction table generation device according to claim 7, wherein
the plurality of combinations of the first wavelength and the second wavelength includes all of the combinations of wavelengths included in the visible band.

9. The color correction table generation device according to claim 3, wherein
the color correction table generation section makes a correspondence between an input color on an outermost shell of the first color gamut and a color having a same lightness and a same hue as those of the input color and a chromaticness of the chroma limit.

10. The color correction table generation device according to claim 9, wherein
the color correction table generation section makes a correspondence between the input color inside the outermost shell of the first color gamut and a color having the same lightness and the same hue as those of the input color and the chroma moving closer to the chroma limit from the chroma of the input color.

11. The color correction table generation device according to claim 3, further comprising:
a color output characteristic measurement section that measures color output characteristic of a display device as an application object of the color correction table,
wherein a reproduction area which the display device can reproduce is determined as the second color gamut based on the result of the measurement of the color output characteristic of the display device.

12. A display device comprising:
an input section to which image data is input;
an image processing device according to claim 1 that corrects an input color of the input image data;
a display section that displays an image of the input image data based on an output color corrected by the image processing device, the first color gamut being a color gamut of the input image data; and
a color correction table generation device, the color correction table generation device including:
a chroma limit setting device that sets the chroma limit, and
a color correction table generation section that generates the color correction table by making the correspondence between the input color in the first color gamut and the color in the third color gamut within a range of the second color gamut and having chroma limited to be no greater than the chroma limit defining the upper limit of the chroma of the output color.

13. A color correction table generation device for generating a color correction table for executing a color correction on an input color in a first color gamut into an output color in a second color gamut, comprising:
a chroma limit setting device that sets a chroma limit; and
a color correction table generation section that generates a color correction table by making a correspondence between the input color in the first color gamut and a color in a third color gamut within a range of the second color gamut and having chroma limited to be no greater than a chroma limit defining an upper limit of chroma of the output color; and
an optimal color data generation device that sets a spectral characteristic of a supposed light source, sets a plurality of spectral reflectance characteristics in a visible band having spectral characteristic having one of a substantially convex shape and a substantially concave shape defined by a first wavelength at which the reflectance changes continuously from 0% to 100% and a second wavelength at which the reflectance changes continuously from 100% to 0% in accordance with a plurality of combinations of the first wavelength and the second wavelength, calculates an object color for each of the plurality of spectral reflectance characteristics based on a present spectral reflectance characteristic and the spectral characteristic of the light source, selects a color having the maximum chroma out of the plurality of object colors having a same lightness and a same hue, and determines the selected color as a limited optimal color, thereby generating the optimal color data representing the limited optimal color,
wherein the chroma limit setting device sets the chroma limit based on the limited optimal color with reference to the optimal color data.

14. The color correction table generation device according to claim 13, wherein
the plurality of combinations of the first wavelength and the second wavelength includes all of the combinations of wavelengths included in the visible band.

* * * * *